(12) United States Patent
Schmidt et al.

(10) Patent No.: US 7,788,319 B2
(45) Date of Patent: Aug. 31, 2010

(54) BUSINESS PROCESS MANAGEMENT FOR A MESSAGE-BASED EXCHANGE INFRASTRUCTURE

(75) Inventors: Patrick Schmidt, Heidelberg (DE); Stefan Baeuerle, Malsch (DE); Stephan Naundorf, Heidelberg (DE); Hermann Burgmeier, Nussloch (DE); Christoph Liebig, Heddesheim (DE)

(73) Assignee: SAP AG, Walldorf (DE)

( * ) Notice: Subject to any disclaimer, the term of this patent is extended or adjusted under 35 U.S.C. 154(b) by 1124 days.

(21) Appl. No.: 10/846,363

(22) Filed: May 14, 2004

(65) Prior Publication Data

US 2004/0254945 A1 Dec. 16, 2004

Related U.S. Application Data

(60) Provisional application No. 60/471,237, filed on May 16, 2003.

(51) Int. Cl.
*G06F 15/16* (2006.01)
(52) U.S. Cl. .................. 709/203; 709/200; 709/201; 709/202; 709/204; 709/205
(58) Field of Classification Search ............ 709/203
See application file for complete search history.

(56) References Cited

U.S. PATENT DOCUMENTS 5,524,253 A 6/1996 Pham et al.

| | | | |
|---|---|---|---|
| 2003/0093402 A1* | 5/2003 | Upton | 707/1 |
| 2003/0093479 A1* | 5/2003 | Mellen-Garnett et al. | 709/205 |
| 2003/0217176 A1* | 11/2003 | Beunings | 709/238 |
| 2004/0148586 A1* | 7/2004 | Gilboa | 717/108 |
| 2005/0021541 A1* | 1/2005 | Rangadass et al. | 707/100 |
| 2007/0033088 A1* | 2/2007 | Aigner et al. | 705/9 |
| 2008/0162498 A1* | 7/2008 | Omoigui | 707/10 |

FOREIGN PATENT DOCUMENTS

WO WO 00/29948 5/2000
WO WO 03/083600 10/2003

OTHER PUBLICATIONS

Barvey, Ajay; "The MOM Player: Java Messaging Service," Internet Document, 'On-line!, Mar. 15, 2002.

* cited by examiner

*Primary Examiner*—Jeffrey Pwa
*Assistant Examiner*—Abdelnabi O Musa
(74) *Attorney, Agent, or Firm*—Mintz, Levin, Cohn, Ferris, Glovsky & Popeo, PC

(57) ABSTRACT

Methods and systems for managing integration of a heterogeneous application landscape are disclosed. The landscape is defined by one or more business process. A business process management system includes an integration server connected between two or more applications in the landscape. The integration server includes a business process engine configured to execute one or more business processes that define message-based interactions between the two or more applications. The business process management system further includes a runtime engine, under direction of the business process engine, for executing one or more messaging services on the message-based interactions between the two or more applications.

15 Claims, 17 Drawing Sheets

BUSINESS PROCESS MANAGEMENT FOR A MESSAGE-BASED EXCHANGE INFRASTRUCTURE

CROSS REFERENCE TO RELATED APPLICATIONS

This application claims priority to U.S. Provisional Patent Application No. 60/471,237, filed on May 16, 2003.

BACKGROUND

The following description relates to enterprise systems and associated architectures and techniques for collaborative business processes. Companies face an increasing need for integration of and collaboration among their information and enterprise software systems. In most current system landscapes, many components are directly connected in a one-to-one relationship with other components, with the integration capabilities hardwired into the application components and individual mappings programs. Under these conditions, managing the collaborative sharing of information is difficult. These infrastructures can rarely represent actual business processes accurately, and are limited in their flexibility to dynamic business scenarios that govern business processes.

New electronic business collaboration, however, typically requires connectivity among all applications inside and outside of company boundaries. Networks such as the Internet provide opportunities for systems to communicate almost instantly with other systems or individuals. Business processes that once were restricted to intranets and their users are now moving to the Internet to become an effective composition of Web services. A Web service is a programmable, self-contained, self-describing, modular application function that can be published, discovered or invoked through an open Internet standard. However, comprehensive system upgrades of existing enterprise software, or large-scale replacement strategies in heterogeneous system landscapes tend to be too costly or otherwise and simply unfeasible in terms of time and capital resource costs.

While technical connectivity is provided using open protocols and standards like the hypertext transfer protocol (HTTP) and extensible markup language (XML), the challenge of mapping different business semantics remains. To capture future rounds of efficiency gains, enterprises increasingly will be required to deploy a new breed of collaborative business processes that cross enterprises or functions within an enterprise. In addition, enterprises will increasingly need to process and manage real-time scenarios instead of performing batch processing.

SUMMARY

This document discloses a business process management (BPM) system and method for managing and executing message-based communication according to actual business processes and scenarios. The BPM system includes a business process engine (hereinafter also referred to as "process engine" for simplicity) configured to execute instructions according to business processes of an application system landscape. The process engine keeps a state on the integration server to handle correlated messages. Correlation means that the process engine is able to identify messages as being semantically linked, such as a purchase order and an invoice regarding a single product. The process engine is able to receive and hold multiple messages in one process instance.

The process engine is configured to execute an explicit serialization (including handling of acknowledgements). This serialization is independent from sender and receiver system(s), and works when more than one receiver and sender system is involved, as distinct from an exactly once in orderEOIO process. The process engine is further configured to execute a process-controlled multicast, to include handling of response messages.

The process engine is also able to collect correlated messages. The process engine also provides transformation services, which are configured for merging multiple messages into one message (such as a purchase order header and an arbitrary number of purchase order positions into a single purchase order), as well to split a message into several parts, e.g. splitting a purchase order into a purchase order header and into an arbitrary number of purchase order positions. A business process (also referred to hereinafter as simply a "process") may use information from all participating messages (messages that the process received earlier), and can route responses to the original sender of an earlier request.

BRIEF DESCRIPTION OF THE DRAWINGS

These and other aspects will now be described in detail with reference to the following drawings.

DETAILED DESCRIPTION

The systems and techniques described here relate to management of business processes that define a message communication protocol between applications in a heterogeneous system landscape. The business process management system and method is optimally implemented in an exchange infrastructure configured to integrate and drive collaboration between various applications in the landscape using open standards and transport protocols such as XML and HTTP.

Figure 1:
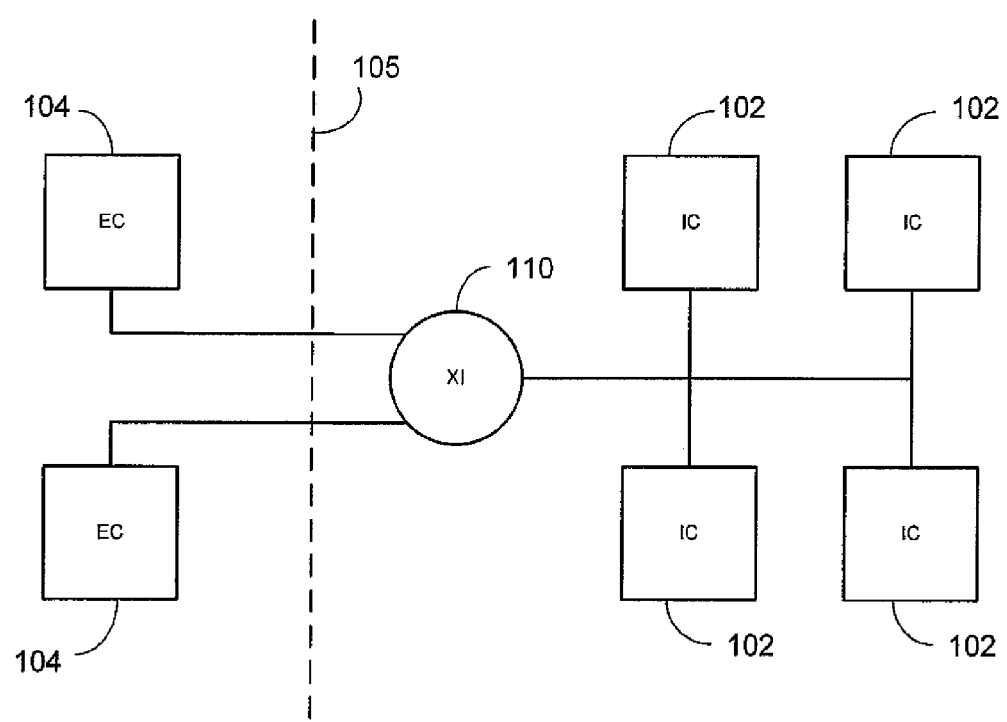
FIG. 1 is a simplified block diagram of an exchange system for integrated, message-based collaboration.

FIG. 1 is a simplified block diagram of a system 100 for integration and message-based interaction of applications. The system 100 includes an exchange infrastructure (XI) 110 for collaborative processing among internal components (ICs) 102 of an enterprise, and between external components (ECs) 104 that communicate to one or more ICs 102 through a firewall 105. The ICs and ECs 102 and 104 represent any of a number of processes or services and their software and hardware, such as Web portals, buying or selling programs, electronic mail, business management programs, project planning programs, etc., and are preferably Web-based applications. Each of the ICs/ECs 102, 104 communicates via messaging with one or more other components according to at least one of a number of communication protocols or standards.

The XI 110 is a self-contained, modularized exchange platform for driving collaboration among the components 102, 104. The XI 110 includes a central integration repository and directory storing shared collaboration knowledge. The XI 110 supports open standards such as various standard markup languages like the extensible markup language (XML), web service description language (WSDL), and simple object access protocol (SOAP) to provide an abstraction of technical interfaces for the components 102, 104, and for message-based communications across heterogeneous component interfaces. The self-contained, modularized functions of the XI 110 can be provided as one or more Web services based on standard Internet technology, and therefore can be published, discovered, and accessed within a network of components 102, 104 using open standards.

Figure 2:
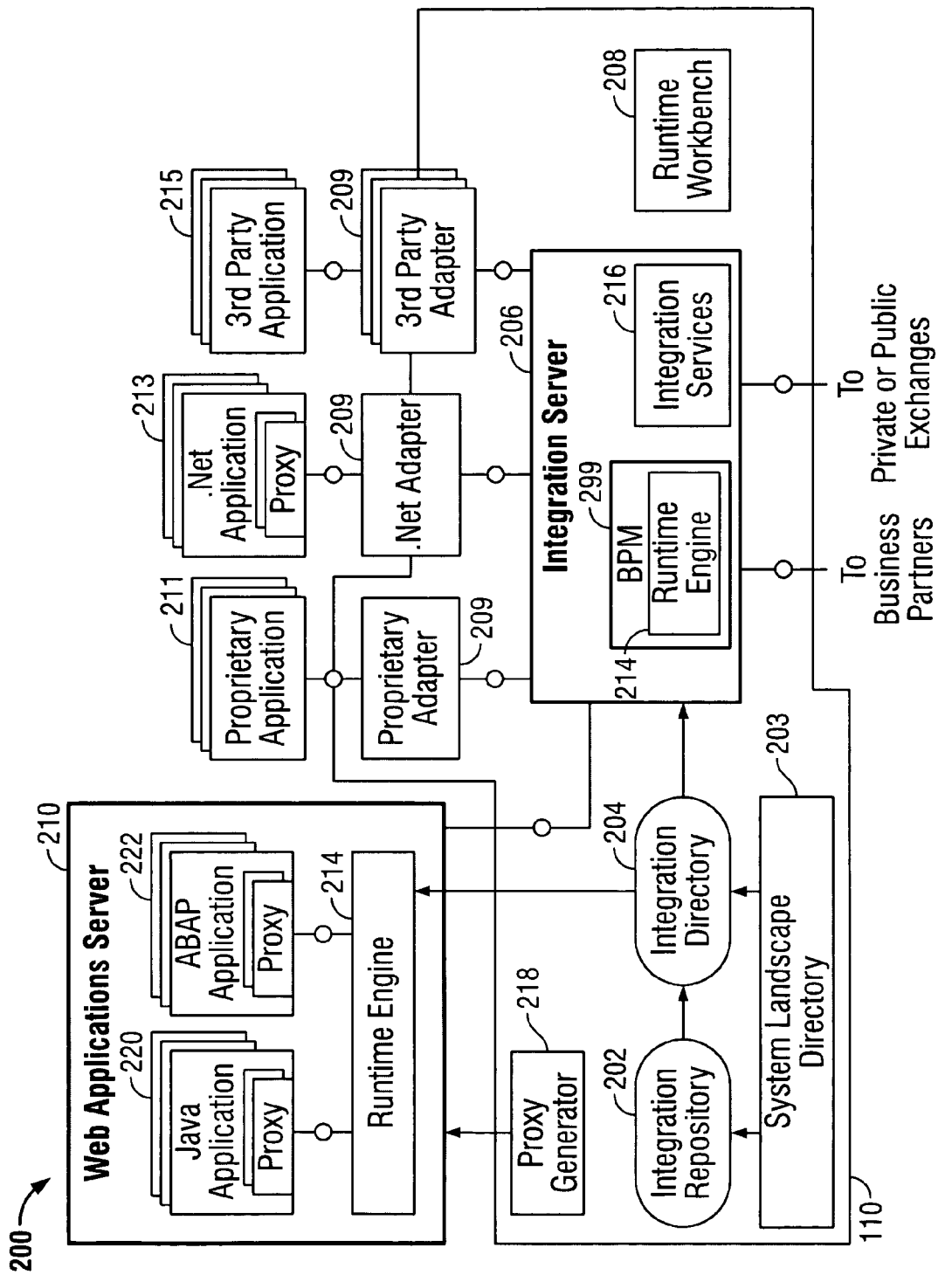
FIG. 2 is a block diagram of an exchange infrastructure.

FIG. 2 illustrates a system landscape 200 including an XI 110 for facilitating message-based collaboration among applications. The exchange infrastructure 110 includes an integration repository 202, an integration directory 204, a system landscape directory 203, and an integration server 206. The integration repository 202 captures design-time collaboration descriptions of all software components that can communicate via the XI 110. The integration directory 204 captures configuration-specific collaboration descriptions of the system landscape 200 at runtime, which includes accessing actual component installations from the system landscape directory 203 and connectivity descriptions for external components, all of which represents the shared business semantics of the system landscape 200. The integration server 206 uses the shared business semantics at runtime to execute message-based collaboration among the active software components.

The integration server 206 includes a runtime engine 214 that provides messaging and business process control at runtime for connecting services and managing the process flow of value chains. The BPM system 299 resides on the integration server 206 below the runtime engine 214. The BPM system 299 includes a business process engine, or "process engine," (not shown) that runs on top of the runtime engine 214 for runtime execution of business process management.

The integration server 206 also includes integration services 216 that typically require an application-specific implementation. Like the integration repository 202 and integration directory 204, the integration server 206 is configured for deployment within any existing system infrastructure. The integration server 206 is preferably a dedicated server that applies the shared collaboration knowledge of the integration directory 204 of the supported system landscape in a runtime collaboration environment. A runtime workbench 208 allows organizations or users to manage the reliable operation of the XI 110.

The XI 110 also includes various adapters 209 that provide connectivity between the integration server 206 and proprietary applications 211, Web-based services 213, and third party applications 215. The XI 110 can also include Web applications server 210 that provides Web-based applications programmed according to standard computing platforms using web-specific programming languages such as Java and ABAP, for instance. The Web applications server 210 also includes an instance of the runtime engine 214 for providing messaging and business process control between Web-based applications such as Java applications 220 and ABAP applications 222, and other components.

New interfaces for software components can be defined using an application component employing a proxy, which allows the interface for the software component to be implemented locally in the XI 110. Proxies make the communication technology stack transparent to applications, and present an application with a programming language-dependent interface. The proxies can be generated by a proxy generator 218 based on information stored on the integration repository 202. The proxy generator 218 uses the interface information described via a standard Web-based language such as WSDL and XSDL to create platform- and programming language-dependent code in the application development system. The communication logic can be implemented based on the proxy that represents the interface description of the respective development platform, such as Java, ABAP, and NET for the web-based applications 213. The proxies convert platform-specific data types into XML and provide access to the component-specific local integration engine. On the outbound side, proxies are generated completely. Outbound proxies can be called via a service invocation provided by an application's developer. On the inbound side, only proxy skeletons need to be generated, as implemented by the receiving application.

Figure 3:
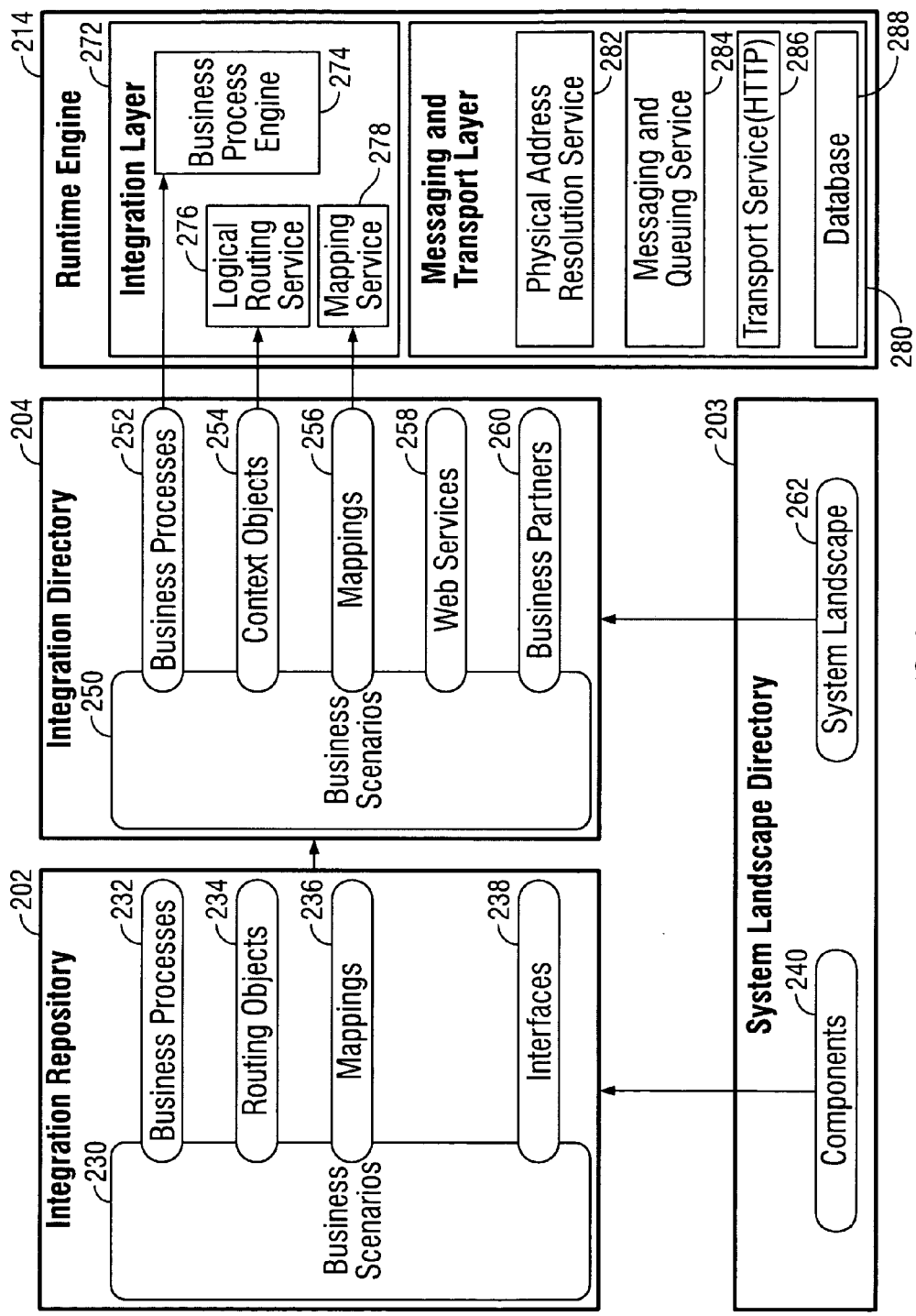
FIG. 3 is a detailed block diagram of an integration repository, integration directory, and runtime engine for collaborative processing.

FIG. 3 illustrates the integration repository 202, the system landscape directory 203, the integration directory 204 and an instantiation of the runtime engine 214 in greater detail. The integration repository 202 includes design-time business processes 232, routing objects 234, mappings 236, and interfaces 238, all of which are defined according to one or more business scenarios 230. The integration repository 202 accesses descriptions of all software components 240 in the system landscape from the system landscape directory 203. The business scenarios 230 of the integration repository 202 describe and configure message-based interaction between application components or enterprises. An enterprise can select one or more business scenarios described in the integration repository 202 as a best practice for rapid configuration of the XI 110.

The business processes 232 can be implemented as extensible compound Web services executed using a business process engine 274. Each business process 232 is modeled centrally in the integration repository 202. A company or user designs each business process 232 according to its business needs, independently of the technical implementation. There may be several categories of business process templates: i.e. generic business processes, industry-specific processes, and company-specific processes, for example. Each process identifies the Web services that are needed and that must be interconnected. In one specific implementation, business processes 232 are defined using a graphical interface. The graphical business process definition language is defined according to the BPEL4WS 1.1 specification. Business processes 232 can be exported into and imported from a standardized format (this is today the BPEL4WS 1.1 specification). An extensible import/export framework makes it possible to provide export/export facilities for other standards or new versions of BPEL4WS. The business process engine 274 can then interpret these models and execute them to drive collaboration among software components.

Routing objects 234 are predefined criteria to determine potential receivers of messages that must be distributed between components and business partners during collaborative processing. Information about the routing objects is used for receiver determination to avoid having to process a complete message before distribution. Mappings 236 define required transformations between message interfaces 238, message types, or data types in the integration repository 202. These transformations cover structural conversions and value mappings. Structural conversions are used for semantically equivalent types that are syntactically or structurally different, whereas value mapping may be used when an object is identified by different keys in multiple systems. In a specific implementation, a graphical mapping tool is provided to assist in mapping, and transforming data is based on the Extensible Stylesheet Language Transformation (XSLT) or Java code.

The integration repository 202 is the central point of entry for interface development, storage and retrieval, and includes interfaces 238 that describe all message interfaces of all software components in the system landscape. Accordingly, the interfaces 238 can be implemented on any software component using any technology. Message interfaces are made up of message types, which are in turn made up of data types. The data types can be described using XML Schema Definition Language (XSDL). An example of a data type is "address," which is used in the message type "Create PO" and can be reused for the message type "Create Invoice." Interfaces 238 can be arranged according to any classification, such as inbound, outbound and abstract, or synchronous and asynchronous.

The components 240 represent component descriptions that include information about application components, as well as information relating to their dependencies on each other. In a specific implementation, the component descriptions are based on the standard Common Information Model (CIM) of the Distributed Management Taskforce. Since the integration repository 202 includes design-time information, only component-type information, independent of actual installation, is stored as components 240 in the system landscape directory 203. The component descriptions can be added using an API or interactively using a graphical user interface.

The integration directory 204 details information from the integration repository 202 that is specific to the configuration of each component as installed in the system. The configuration-specific collaboration descriptions of the integration directory 204 can be generated automatically from content in the integration repository 202 or manually by a user using a graphical user interface. In one implementation, the integration directory 204 is built on a Java platform and its content is represented via XML using open Internet standards. The integration repository 202 can be upgraded without affecting the integration directory 204 or any runtime collaborative processes. The user then decides which changes should be transferred to the integration directory 204, either as predetermined automatic upgrades or manually via graphical tools.

The integration directory 204 includes configuration-specific descriptions of business scenarios 250, business processes 252, context objects 254, and executable mappings 256. The integration directory 204 also includes descriptions of active Web services 258, and active business partners 260. The integration directory 204 uses a description of the active system landscape 262 from the system landscape directory 203. The business scenarios 250 in the integration directory 204 represent the overall view of the interaction among interfaces and mappings 256 in the context of the actual configuration relevant for the specific implementation. The business processes 252 represents an executable description of all active business processes.

The context objects 254 determine the receivers of a message on a business level. In one specific implementation, the content of a message is used as a context object 254. Other parameters may also be used. Relevant input parameters include the sender, the sender message type, the message to identify the receivers, and the receiver message type. The context object 254 can be described declaratively using XML Path Language (Xpath, i.e. by using a graphical tool) or can be coded in Java. The integration engine 214 at runtime accesses information on the context object 254.

The context objects 254 may use logical terms to describe senders and receivers in order to separate them from the physical address provided by the Web services 258 described in the integration directory 204. The physical address can therefore be changed without changing business-oriented content. Mappings 256 in the integration directory 204 represent mappings required in the active system landscape, in contrast to the integration repository mappings 236 that contains all supported mappings. Some new entries however, such as a new sequence of mappings, can be made only in the integration directory 204 to address additional Web services for mapping, for example. The integration engine 214 accesses the integration directory mappings 256 at runtime.

Context objects 254 provide a unique name for accessing semantically identical payload information. For instance, a context object can provide a unique access name for 'plant' for invoice and purchase order. The XPath for 'plant' in an invoice can be defined as '/A/B/C/plant' and the XPath for 'plant' in a purchase order looks like 'X/Y/Z/werk'. The context object 254 'plant' is assigned to the message interface invoice and purchase order where the XPaths as above mentioned are specified. This makes sure that the XPath for plant is not defined at n different places.

Web services 258 describe interfaces implemented within the current active system landscape, as well as active Web services supported by described business partners 260. As such, information describing Web services 258 can be exchanged with Universal Description, Discovery, and Integration (UDDI) compatible directories or added manually. Each Web service 258 description also provides physical addressing details, access information, and other special attributes such as uniform resource locator (URL), protocol, and security information. In one implementation, the Web services 258 are described in WSDL, and SOAP and ebXML are used as messaging protocols. The integration engine 214 accesses information about the Web services 258 at runtime as well.

The system landscape 262 of the system landscape directory 203 describes the current system landscape that uses the XI 110. The system landscape 262 describes the components that are installed and available on certain machines within the system, the instance or client that was chosen, further information on the installed components, other system landscapes, and so on. The system landscape 262 description is based on an open architecture and can adhere to any widely accepted standard such as the Common Information Model (CIM). Thus, many proprietary and third party components can be configured to automatically register themselves in the system landscape 262 upon being installed within the actual system landscape. Access interfaces to the system landscape 262 description can be based on open standards as well, such as the Web-based Enterprise Management (WBEM) and SOAP standards.

Business partners 262 defines information for business partners of an enterprise, such as names, addresses, and URLs, but may also contain more detailed and sophisticated information. For instance, the business partners 262 may include a description of the message formats that can be directly received and processed, or of security protocols used for safe communications, or trading terms that are employed in the partnership. The kind of information stored in business partners 262 can be governed by enterprise-specific decisions of the enterprise using the XI 110.

The integration directory 204 and the runtime engine 214 form a collaborative runtime environment for executing collaborative business processes. The collaborative runtime environment provides all runtime components relevant for exchanging messages among the connected software components and business partners. The integration server 206 executes the collaborative runtime environment or Web application server 210, either of which can include an instance of the runtime engine 214 in accordance with informational resources provided by the integration directory 204.

The runtime engine 214, which exchanges all messages between the various interconnected components, includes two layers: an integration layer 272 and a messaging and transport layer (MTL) 280. The integration layer 272 includes a business process engine 274 executing centrally modeled business processes, a logical routing service 276 and a mapping service 278. The MTL 280 provides a physical address resolution service 282, a messaging and queuing service 284, a transport service 286 via HTTP, and a database 288. The integration services 216 in the integration server 206 can support the runtime engine 214. An MTL 280 is also included in each instantiation of the runtime engine 214 in Web applications servers 210, as well as in each adapter 209 of the adapter framework connecting to various software components. Each MTL 280 has a role in the execution of the EO protocol, as will be explained further below.

At runtime, business processes 252 are instantiated and executed by the business process engine 274, which executes the respective Web services described in Web services 258 independent of their location according to the business process model. The business process engine 274 is independent of the semantics of the executed business processes 252, and is configured as a mediator and facilitator for business processes 252 to interact with technical components of the runtime system landscape.

Figure 4:
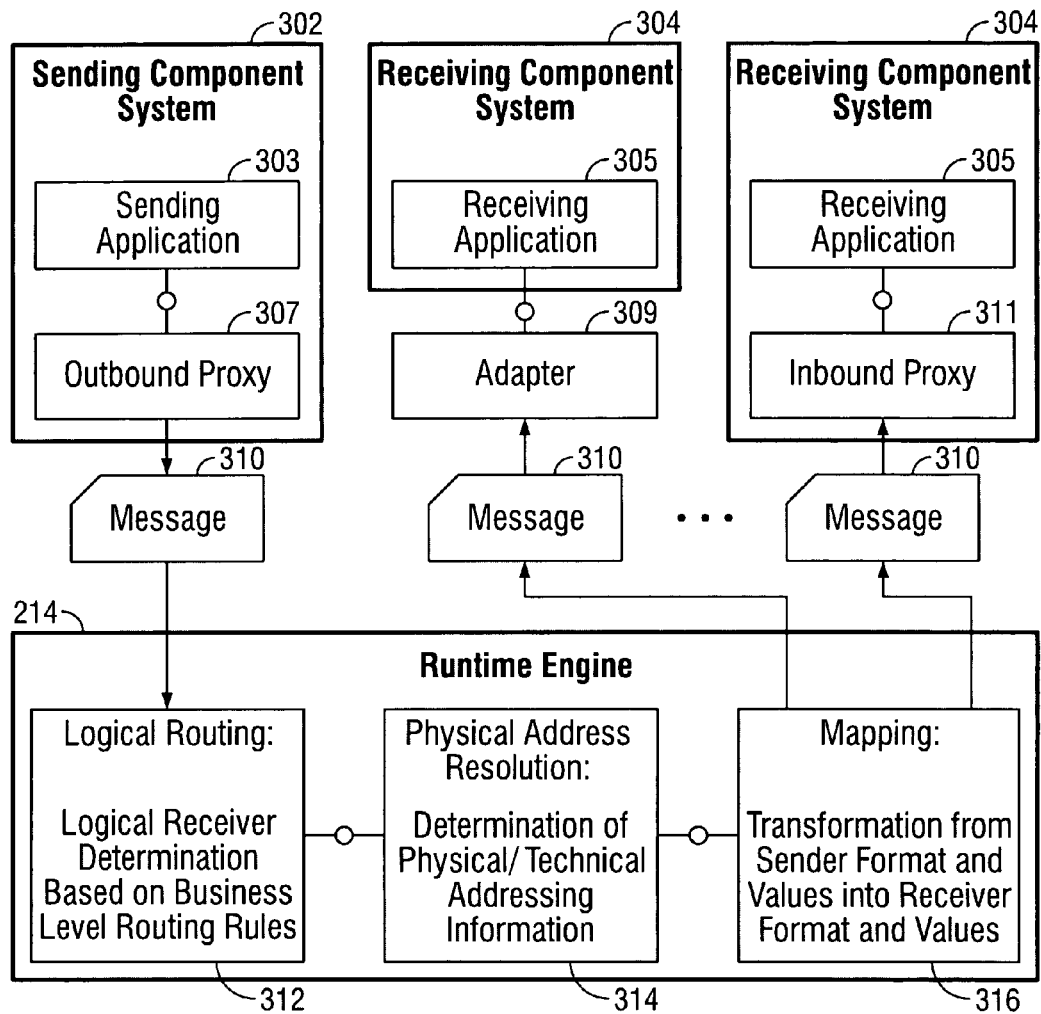
FIG. 4 is a block diagram illustrating a process for communicating a single message between two or more applications.

FIG. 4 is a block diagram illustrating several functions of the runtime engine 214 and BPM 299 in a process of exchanging a message between applications. A sending application 303 resides in a sending component system 302, which represents the hardware and software platform of the sending application 303. One or more receiving applications 305 each reside in a receiving component system 304. A communication path for a message 310 can include an outbound proxy 307 at the outbound interface from the sending component system 302, through the runtime engine 214 and adapter 309 to the receiving component system 304. A receiving component system 304 may also utilize an inbound proxy 311 rather than an adapter. The configuration and connectivity of the shown receiving component systems 304 is merely exemplary, and it should be noted that such configuration and connectivity could take any number of forms. The pictured example illustrates both asynchronous and synchronous communication. In synchronous communication, routing and physical address resolution is only needed for the request as the response is transferred to the sender, which is already known.

For a given message the logical routing service 276 uses information on the sending application and the message interface to determine receivers and required interfaces by evaluating the corresponding routing rules, as shown at 312. The routing rules are part of the configuration-specific descriptions of the runtime system landscape provided by the integration directory 204, and can be implemented as XPath expressions or Java code. The mapping service 278 determines the required transformations that depend on message, sender, and sender interface, as well as the receiver and receiver interface, at 314. In the case of asynchronous communication, even the message direction is determined to appropriately transform input, output, and fault messages.

After retrieving the required mapping from the integration directory 204, the mapping service 278 can either execute XSLT mappings or Java code (or any combination in a given sequence) to the content of the sent message. Below the integration layer, messaging, queuing, and transport services 284 move the message to the intended or required receiver(s). After the message is transformed into the format expected by each receiver, the physical address of the required receiver service and other relevant attributes are retrieved from the integration directory 204 and mapped to the message, at 316.

A queuing engine (not shown) in the messaging and queuing service 284 stores ingoing, outgoing, erroneous, and work-in-progress messages persistently. The messaging layer of the runtime engine 214 provides queuing functions for the physical decoupling of application components and guarantees messages are delivered exactly once according to a protocol (i.e. the "EO protocol"). The transport service 286 enables the runtime engine 214 to act as both a client and server. The transport service 286 implements a client that enables outbound communication and a server that handles inbound communication by accepting incoming documents. Additional server functions can address situations in which the receiver has no server by supporting polling over the transport protocol used. Preferably HTTP is used, but other transport protocols may be used as well.

Figure 5:
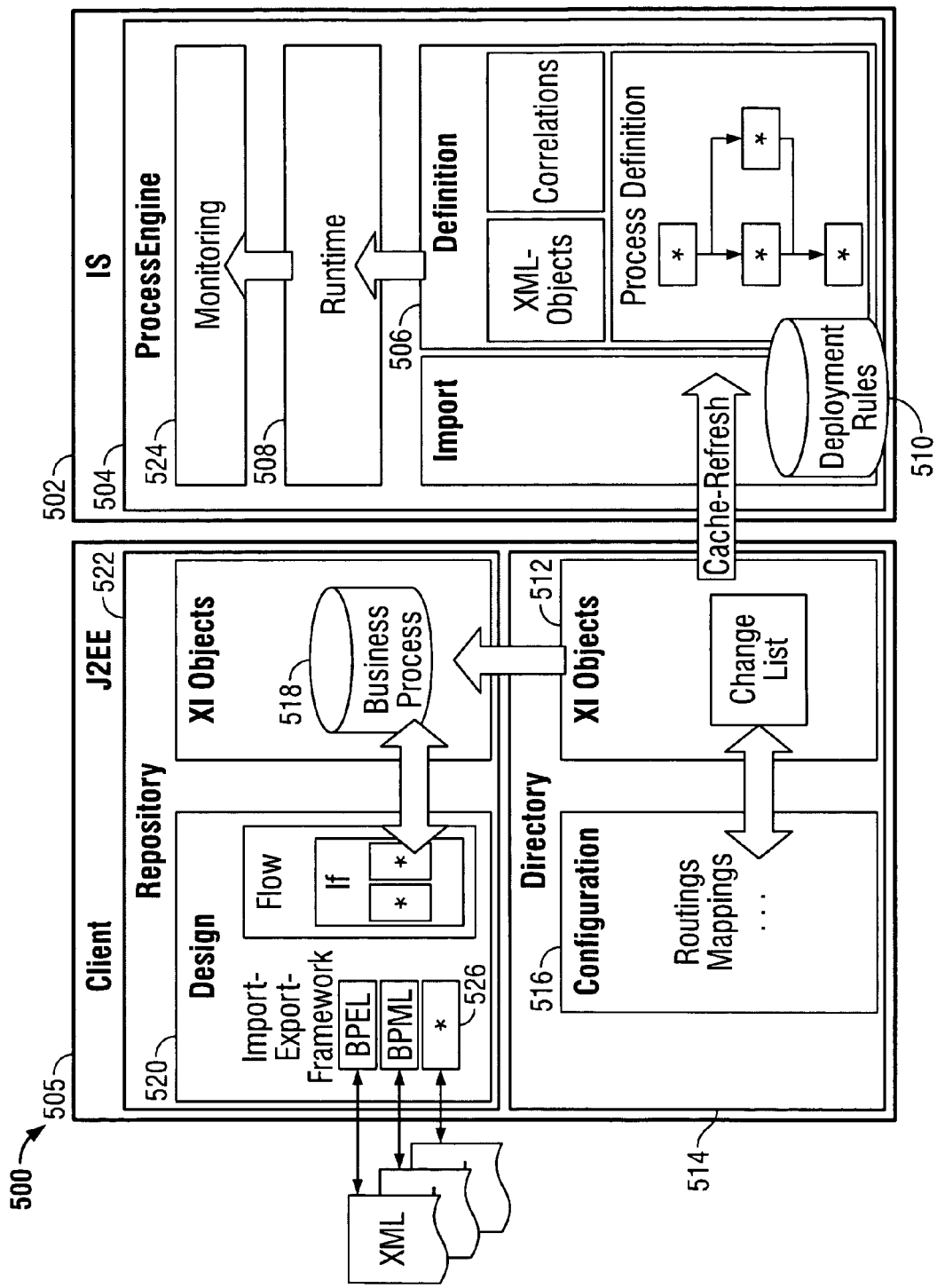
FIG. 5 is an architectural block diagram of a BPM system including an integration server and a business process engine.

FIG. 5 is an architectural block diagram of a BPM system 500, which includes a process engine 504 integrated in an integration server 502. The process engine 504 and integration server 502, as they are called in their runtime configurations, are also respectively known as a process editor and an integration builder in their "definition time" configurations. Process definition 506 and BPM runtime 508 in the BPM system 500 are based on different development platforms. For instance, the process definition 506 is based on Java, such as a J2EE platform 505, and the runtime 508 is based on ABAP. The BPM system 500 includes monitoring and administration tools 524 on the integration server 502.

The process definition 506 module utilizes XML objects and correlations to define processes, based on deployment rules imported from XI objects 512 from the integration directory 514. The XI objects 512 are based on the routings and mappings defined for the system runtime configuration 516. The XI objects 512 are also used to define business processes 518 in the integration repository 522, and the design-time configuration 520 of the system landscape. Business processes 518 are integrated with all other integration repository 522 objects and tools, which allows links to and from other XI objects. Processes (i.e. patterns and templates) can be delivered to customers, and extension concepts may be provided. Application specific content can also be delivered. Some applications can create processes and/or extensions that can be delivered to customers. The BPM system 500 includes an import/export framework 526 that imports and exports standards-based adapters for universal connectivity. The BPM system 500 can include an interface for receiving user-specified business process details.

Business process modeling scenarios are also known as modeling patterns (or simply, "patterns"). The following described patterns are high-level building blocks, and can be combined with each other and with atomic process engine 504 functions such as deadlines, exceptions, etc.

1) Send and Receive: Sending messages controlled by the process engine 504 is often combined with receive steps that wait for a correlated response message. A receive step should wait for the messages starting with the activation of the associated correlation as a queuing mechanism.

2) Serialization: This pattern can include the following steps: 1. Receive messages and store them locally in the process data context; 2. Keep the data context and start sending received messages when a certain condition has been fulfilled; and 3. Send received messages in a given order respecting dependencies of receivers. This third step can be: a. Without caring about responses/acknowledgements ("fire and forget"); or b. Receiving a response or an acknowledgement (enables serialization). The process engine 504 can be configured to wait for a technical ACK of or business response from a previously-sent message before sending a next message.

3) Transformations/Merge/Split: The process engine 504 transforms messages within the process context. The following transformations can be performed: 1. (N:1) Transform several collected messages to one new message (e.g. transform several invoices to one combined invoice or transform PO header and several PO positions into one PO); 2. (1:N) Transform one message into several other messages (e.g. transform a combined in-voice to invoice respecting the original POs); and 3. (1:1) is a special case of the transformations described above. N:M mappings are also possible if needed.

4) Multicast: The process engine 504 can be configured to calculate the receivers of a message (also using content-based conditions) and to send the message to these receivers, either without regard to responses/acknowledgements ("fire and forget") or based on receiving a number of responses/acknowledgements. Messages may be sent out in parallel or sequentially.

5) Collect: This pattern uses receive steps in which an arbitrary number of messages can be received. From a process point of view, the end of the collecting scenario can be defined via "push," (i.e. a certain condition is reached, such as N messages have arrived, a certain deadline has been reached, etc.), or "poll" in which the process engine waits for a special message that indicates the end of collecting.

Figure 6:
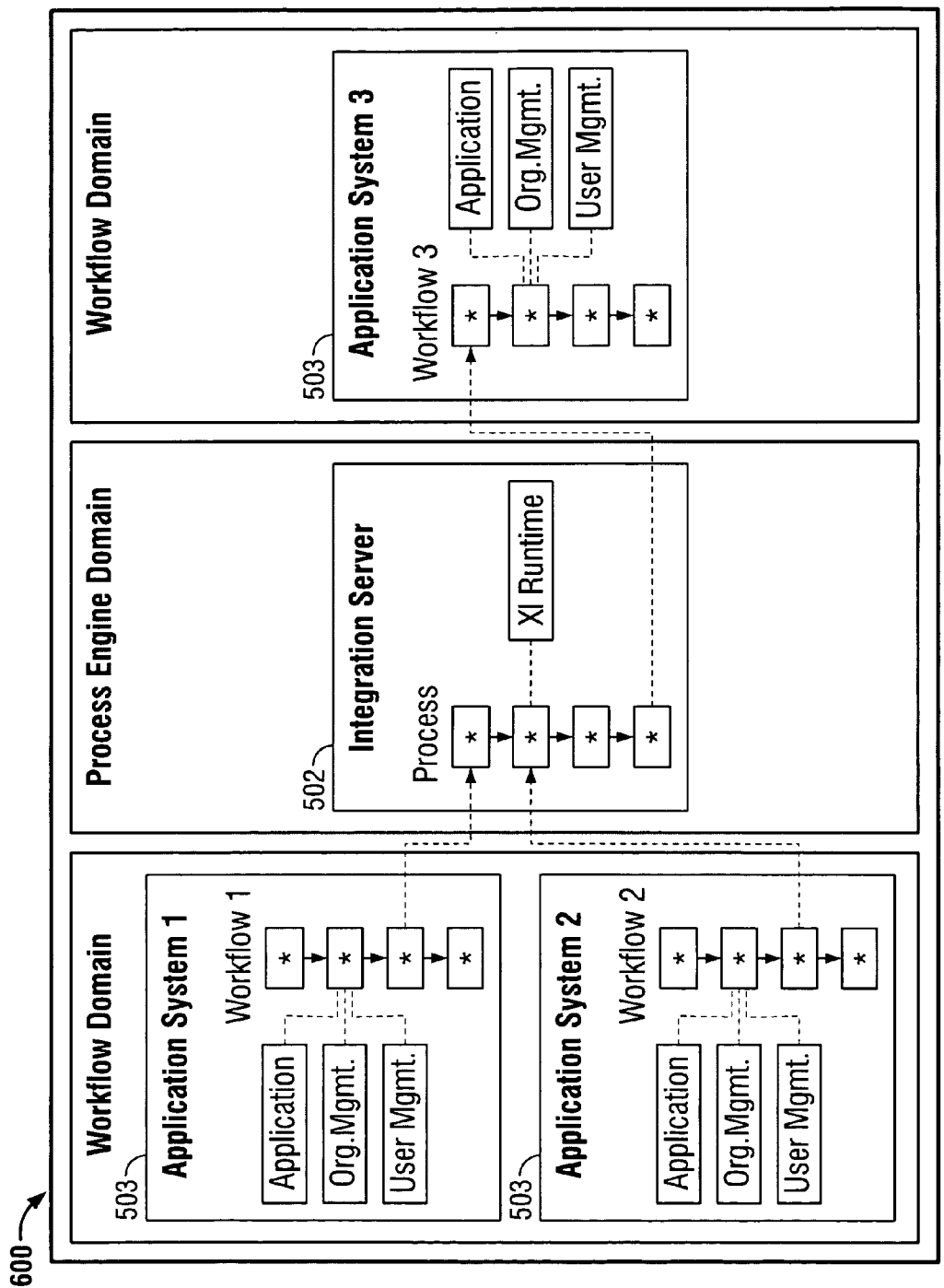
FIG. 6 is a workflow diagram of a BPM system.

With reference also to FIG. 5, FIG. 6 illustrates a workflow 600 of a BPM system 500 runtime and respective process engine of the integration server 502 orchestrating several 'client' application systems 503. The integration server 502 is a standalone component that communicates via messages with the client application systems 503. Message-related functions (send, create, transformation, merge, split, etc.) are preferably realized by service calls to messaging layer of the integration server 502 ('lower-level XI-runtime functions'). The process engine 504 preferably does not change the message-payload directly. Rather, messages are changed by transformation, which is explained further below.

The process engine 504 focuses only processes on the integration server 502, not on application systems 503. The process engine 504 is not used to control processes in the backend systems, but while it is able to communicate with backend processes via messages, the process engine 504 does not interact with the applications, organizational and user management functions in the backend system(s). The process engine 504 uses the messaging layer a application while Business Workflow uses the application, user- and organizational management of the respective application system. The process engine 504 supports the communication via synchronous outbound interfaces.

Business Process Management

The integration of process management into the XI landscape can described in two parts: 1) the "outside view," which covers all references to and from the business processes; and 2) the "inside view," which looks into the processes and the modeling tools.

Outside View

Processes will have representations both in the integration repository 522 and the integration directory 514. Process definitions will be created and stored only in the integration repository 522. This allows the transport of process definitions to the client systems 503. Processes stored in the integration directory 514 will rely on a thin representation, which will point to an associated process definition in the integration repository 522. Each business process, as an XI object (visible in the navigation tree and usable in links from and to other XI objects) will provide the ability to integrate the process engine 502 in the XI environment. Business processes 518 can use established XI object types, and will not create redundant object types. Business processes 518 include public parts, such as previously-used interfaces, and private parts, which include the process graph using step types and correlations. Process instances can be stopped and restarted in runtime 508. Process instances can also be restarted from a specific step (e.g. if an error occurs during a certain step, restart from that step).

Figure 7:
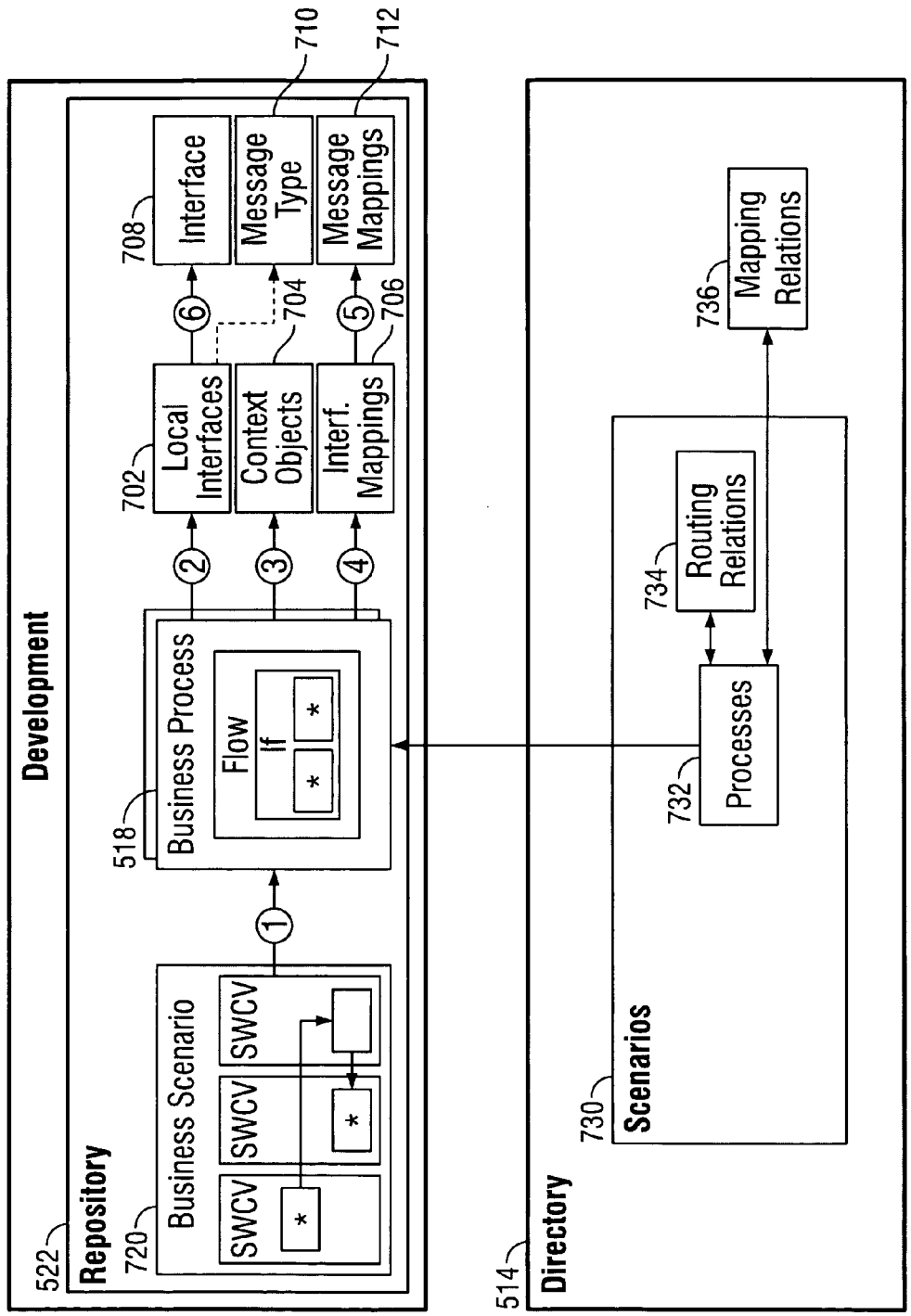
FIG. 7 illustrates links to and from business processes.

FIG. 7 illustrates links to and from business processes 518 in the integration repository 522. The links include references to: (2) abstract interfaces 702; (3) context objects 704; and (4) interface mappings 706. Absolute links include: (1) the action of a business scenario references a process definition; (5) an interface mapping 706 references a message mapping 712. Business processes 518 can be used in business scenarios 720, and will act as brokers between business systems.

A business process 518 owns a process interface 708 which reflects all inbound and outbound communication. Interfaces used in the process interface 708 include two types: process-specific interfaces (a special normalizing interface for the process); and mirrored outbound/inbound interfaces of sending/receiving business systems (to avoid the creation of unnecessary interfaces). Mirroring must be done creating a new abstract interface 702 pointing to the same message type as the original interface. Abstract interfaces 702 can be used in an inbound as well as in an outbound role. That ensures that no mapping for a message received by the process and sent out afterwards without changes (without transformation) is necessary. Would the process need inbound and outbound messages, a transformation from inbound to outbound would be required. In addition, process-specific interfaces do not need to have proxies in the attached business systems. This leads to the so-called abstract interfaces 702, which are the only type of interfaces that can be used by the business processes 518. Local interfaces may reference other interfaces 708 (to handle the mirroring) and they also may reference message types 710 (to realize process-specific interfaces).

Context objects 704 can be used to access payload information via name or other message content. Data may not be written to context objects 704. Interface mappings 706 are addressed by a business process 518 within the transformation step.

A business scenario 720 may reference one or more business processes 518. One business process occupies one "swim lane" or process flow. Each process is treated as a business system. Actions within process swim lanes are not stored as separate actions that are reusable. An action represents an interface used by a business process 518 as outbound or inbound interface (or both). In a 'normal' scenario case, not all interfaces of an action must be a target or source of a connection. In the business process case, each action represents one interface with inbound and/or outbound semantics and must be used as target and/or source in a connection. Navigation from the business scenario 720 to the business process 518 is provided.

Figure 8:
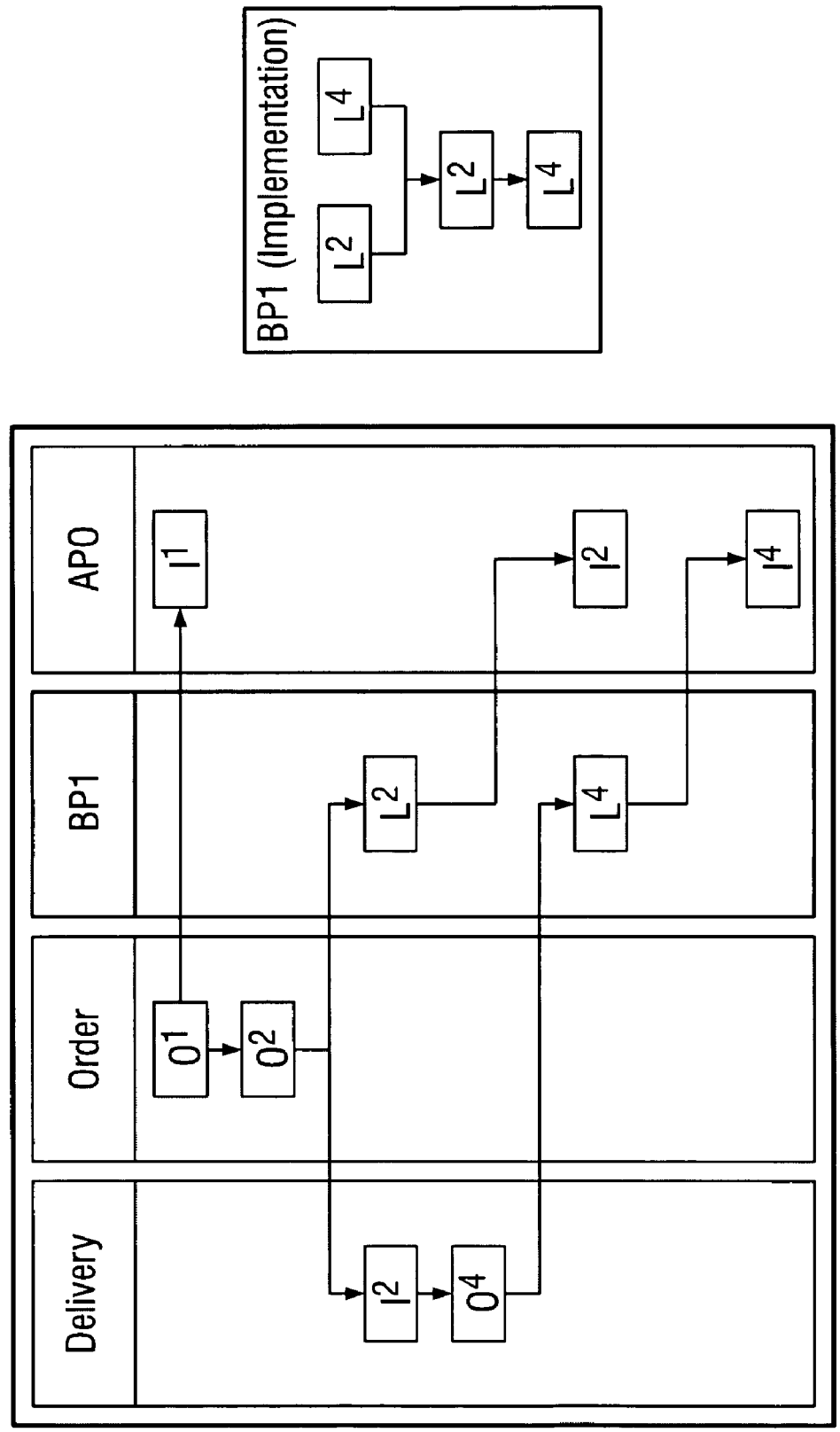
FIG. 8 shows a serialization use case of a BPM system.

FIG. 8 shows a simple serialization use case. O* represents an outbound interface. I* represents an inbound interface. L* represents a local interface. Messages of interfaces L2 and L4 are received by the business process (each of them can arrive first and start the process) and sent out in sequential order. Each action represents one interface that is used as an inbound interface (receive) and an outbound interface (send) by the business process. Therefore, each action has two connections: to and from the action.

Figure 9:
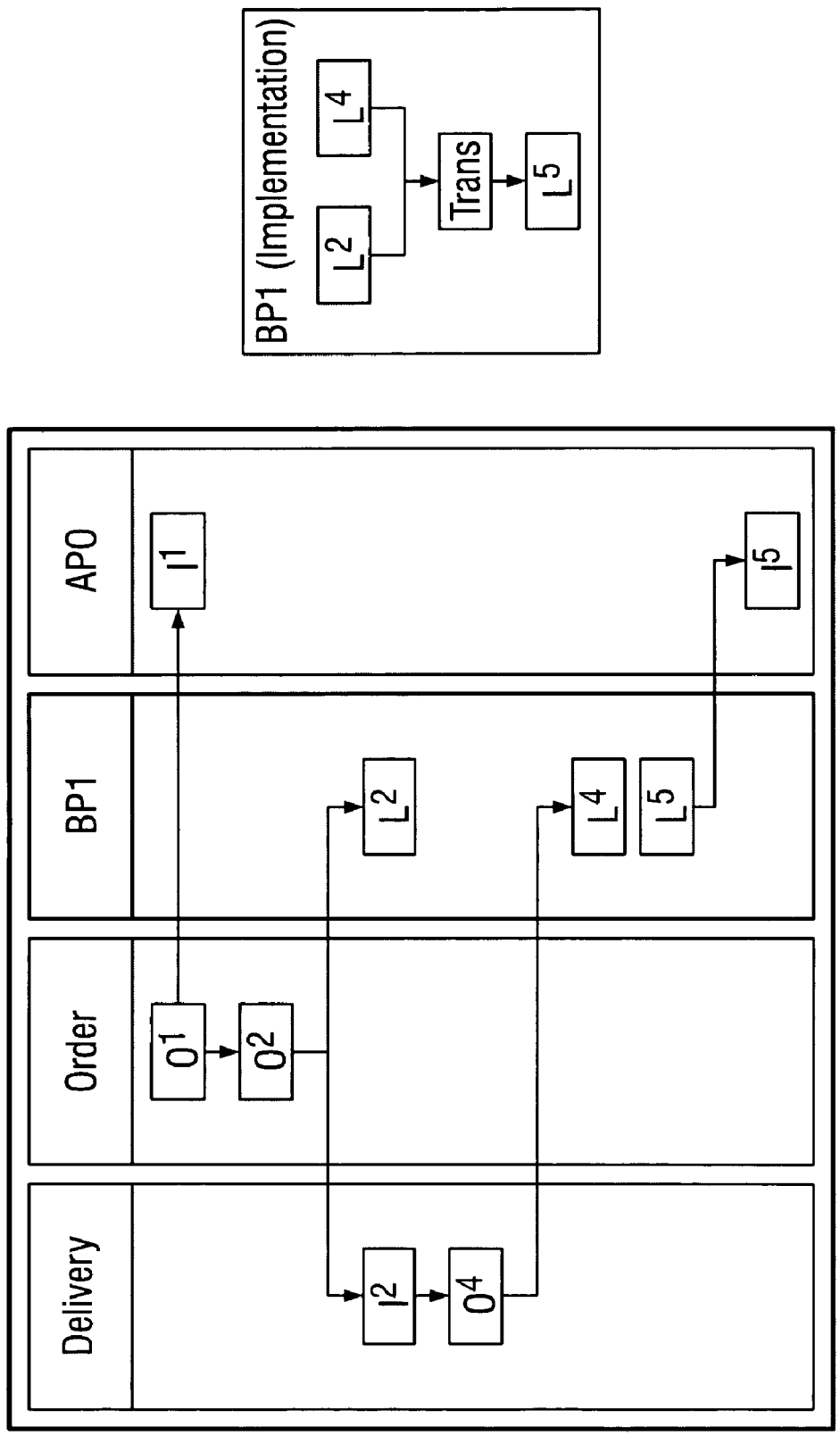
FIG. 9 shows a basic merge scenario of a BPM system.

FIG. 9 shows a basic merge scenario. Messages of interfaces L2 and L4 are received by the business process (each of them can start the process) and transformed into a new message of interface L5 which is sent out. The actions representing the interfaces L2 and L4 have only inbound (receive) connections, while the action representing interface L5 has only an outbound connection (send).

Regarding a business scenario, a business process may be modeled in different ways. One way is called "process first," or bottom up, which includes creating a process definition and process interface. This process signature includes interfaces that have an inbound and/or an outbound role. Messages of these interfaces can be received/sent by a process. The process signature can be derived from the process definition and the container elements and does not need to be defined by the process designer. The inbound part of the process interface is based on receive steps that receive messages of a given interface (i.e. the type of the container element that should be received). The outbound part of the process signature is based on send steps that send messages of a given interface (i.e. type of the container element that is sent)). This method also includes introducing a process definition in a business scenario. Within the business scenario, actions refer to interfaces of the business process.

Another way a process can be modeled is called "scenario first," or top down, which includes the following steps: 1. introduce process definition as a swim lane in a business scenario (create process definition implicitly if it does not exist); and 2. add Actions to the swim lane of the process (implicitly create/edit the process interface).

As illustrated in FIG. 7, the transition from integration repository 522 to integration directory 514 should be as effortless as possible. In one embodiment, the process 732 in the integration directory 514 is created, named and linked to the active process definition 518 in the integration repository 522. It is also possible to have more than one process in the integration directory 514 pointing to the same process in the integration repository 522. Thereafter, all other integration directory objects can be linked with the process 732. To ease this transition, processes 732 can be included in a user-configurable transition "wizard" that is displayed in a user interface.

The process 732 in the integration directory 514 comprises a thin representation: the process is identified by a name and embraced in a business scenario 730 due to the dependency of routing relations 734 on the business scenario 730. The directory process 732 contains a reference (link) to its originating repository process 518 (active version). Accordingly, the process representation in the integration directory 514 will not contain a process definition. Accordingly, process customization or configuration in the integration directory 514 is not necessary.

The process 732 in the integration directory 514 allows specifying routing relations 734 and mapping relations 736 from and to the process 732. That means, mapping and routing functions need to recognize a business process 732 as a source or target (i.e. business processes can be addressed like business systems). It must be visible in an integration builder interface whether a process or a business system is addressed. Processes 732 are also used as senders of messages in the routing. For example, two different send steps should be distinguished within the same process that sends messages of the same interface to different receivers.

Figure 10:
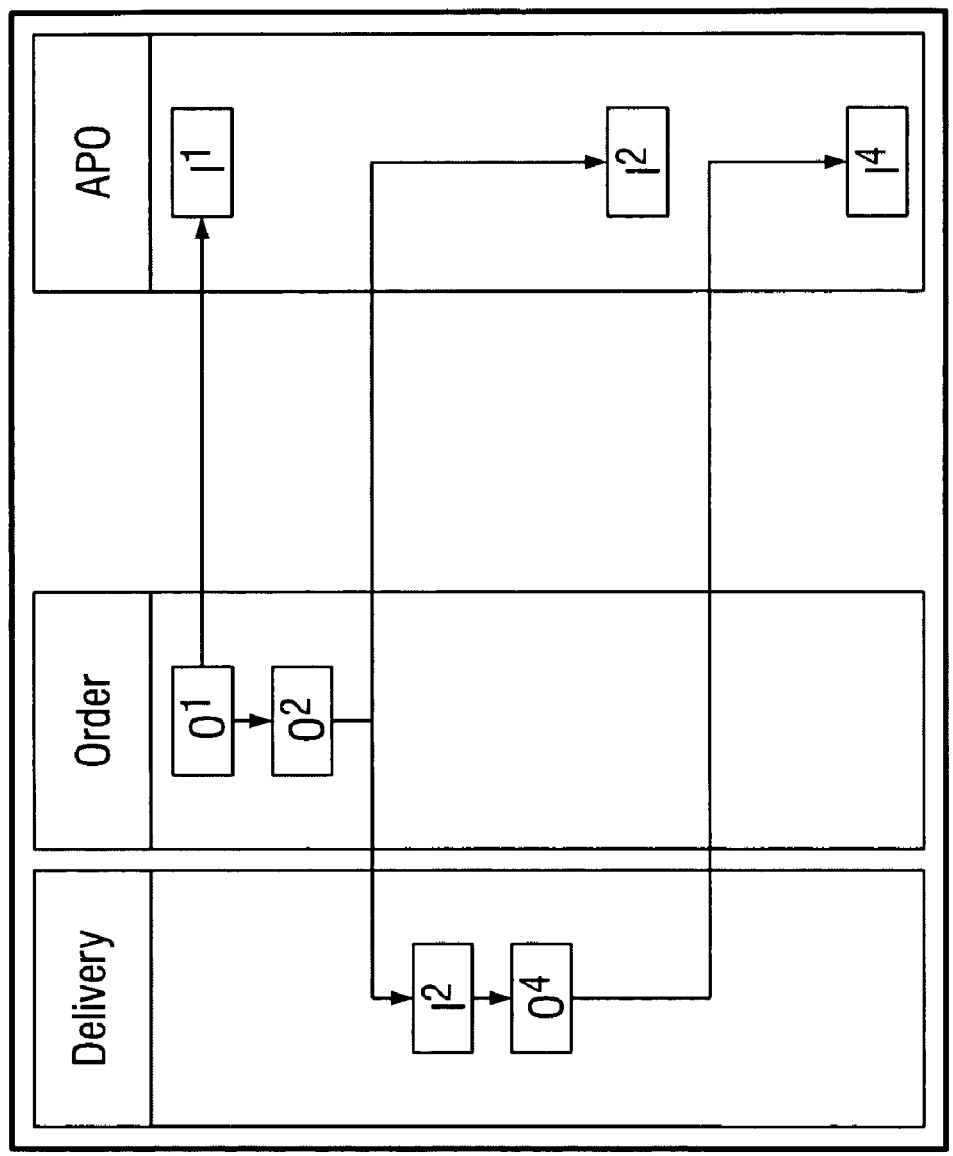
FIG. 10 illustrates a stateless communication scenario in a BPM system.

The transition from a stateless scenario (without process) to a stateful scenario (with process) should be as smooth as possible. FIG. 10 shows a stateless communication. The connections (routings) O2 to I2 and O4 to I4 can be serialized, where O and I are used interfaces.

Figure 11:
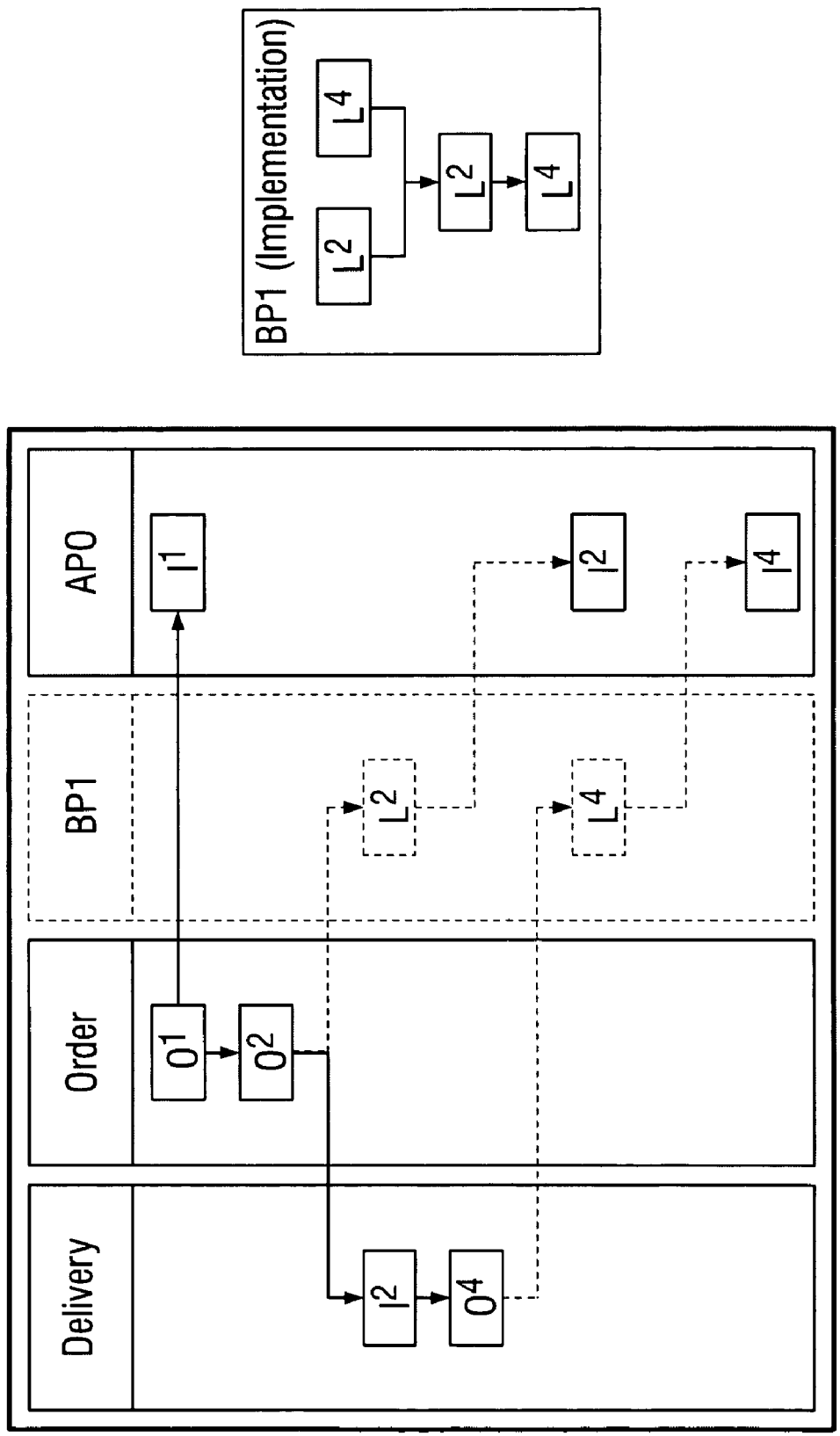
FIG. 11 illustrates a stateful communication scenario in a BPM system.

FIG. 11 illustrates a stateful scenario. To create a stateful scenario, the connections (routings) O2 to I2 and O4 to I4 need to be removed. The local Interfaces L2 (mirrored interface to O2) and L4 (mirrored interface to O4) as well as the process definition need to be created. Next, a process swim lane (BP1) needs to be introduced in the business scenario. The actions can be taken over from the process interfaces and the connections (routings) from and to the process must be adapted: O2 to L2 and L2 to I2; and O4 to L4 and L4 to I4. Mappings that have been used between interfaces O2 and I2 can be reused between the interfaces L2 and I2 (since L2 is a mirror of O2). The same can be true for O4/L4 and I4.

The system can include a graphical process modeling tool for graphical modeling of business processes. The graphical process modeling tool includes a process builder graphical user interface (GUI) that graphically illustrates modeling elements and basic modeling paradigms.

Each process is executed using data that is available within the process. This data is stored in container elements (variables) that are entities of the process container. The container elements can be defined when modeling a process and include a unique name and a type. A container element can be defined as multi-line (i.e. table of elements). Container elements can be grouped according to a type. One such type is interfaces (i.e. for the messages that are handled by the process). Another such type is simple XSD types (i.e. for process control data e.g. counters, etc.) Receivers can also be specified as one data type as needed for multicast.

The process interface represents the (interface-) signature of the process. It includes interfaces that have an inbound and/or an outbound role. Messages of these interfaces can be received/sent by a process. The process interface can be derived from the process definition and the container elements. The inbound part of the process interface is based on receive steps that receive messages of a given interface (i.e. type of the container element that should be received). The outbound part of the process interface is based on send steps that send messages of a given interface (i.e. type of the container element that is sent).

Messages that are sent to a process need to be delivered not only to the process definition, but also to the correct instance of the process. This "instance routing" can be accomplished generically. Starting a new process instance is a special case. The messages that are handled by a process are loosely coupled. The dependency of messages that should be handled by the same process relies on the business data.

Correlations are the means to define these dependencies. The declarative specification of a correlation relies on the declarative properties of messages. A property is simply a field within a message. Correlations can be defined using multiple fields. The position of correlation tokens (i.e. values for the correlation properties) in each message can be expressed declaratively in the process definition. Correlations can be instantiated within the scope of a process instance as long as the first message that keeps the information is available. This instantiation is modeled by a send and receive steps.

Processes can only be triggered by message arrival. Starting a process via application call or via API or via human interaction can be mapped into using triggering messages. Triggering messages can be identified in the receive step. Accordingly, a received message can be declared as a triggering message, similar to BPEL4WS. To be able to declare a receive step as triggering, this step needs to be defined at the beginning of the process.

Receive steps are used to consume messages that are sent to a process. Each receive step will get its own message, even if multiple receive steps wait for messages of the same interface. If a message is sent to a process and the receive step has not been instantiated yet, the process engine queues the message until the receive step is reached.

As described above, messages are sent to a process. If no receive step consumes a message, the process will cache the arriving messages. If a receive step is reached, the "oldest" message is fetched out of the cache and the receive step completes. If the process reaches a receive step and the cache is empty, the process waits until a new message arrives. Each receive step instance in the BPM system gets its own message, unlike a classical event-based publish and subscribe, where several event consumers are notified upon the same event.

The receive step references all correlation(s) which have to be fulfilled to complete the receive step. In the case of more then one correlation, all referenced correlations must be fulfilled to complete the receive step (and semantics). A receive step also references the correlation(s) that need to be instantiated upon the consumption of the received message. The arrival of a message is the only way in which new data can be brought into the process.

Figure 12:
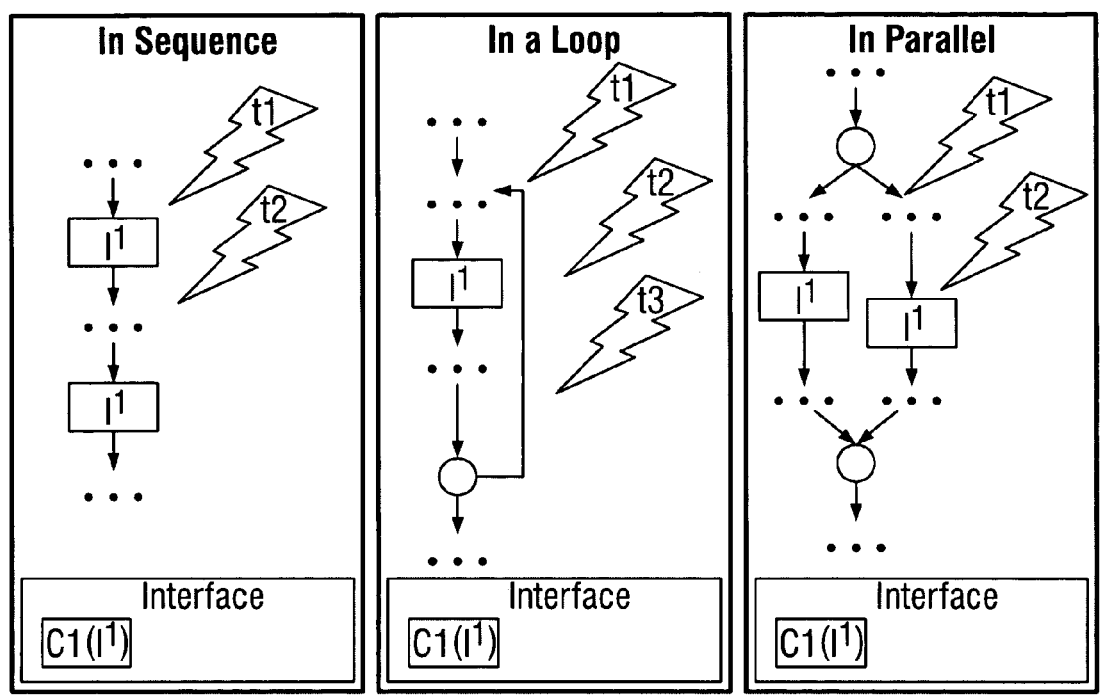
FIG. 12 shows three types of communication scenarios in a BPM system.

There can be multiple receive steps for messages of the same interface. As shown in FIG. 12, at least three scenarios may be possible: in sequence; in parallel; and in a loop. These will be discussed now in turn.

In the sequential scenario, multiple receive steps are waiting for messages of the same interface. The messages arrive at different points in time (t1 and t2) while the receive steps begin a wait period from the correlation activation time. The semantics are as follows: each receive gets its own (different) message; the first message completes the first receive step while the second message completes the second receive step; the first message does not complete both (or more) receive steps. This action avoids race conditions and ensures that no message is lost.

In the looped scenario, a receive step is waiting within a loop for messages of the same interface. The messages (of the same interface) arrive at different points in time (t1, t2 and t3) while the receive step waits from the correlation activation time on. The semantics are as follows: if no receive step consumes the message, the process will cache all arriving messages; if a receive step is reached, the "oldest" message is fetched out of the cache and the receive step completes; if the process reaches a receive step and the cache is empty, the process waits until a new message arrives. Such a 'Looped Receive' helps to realize a collect scenario.

The parallel scenario covers the situation in which two receive steps are waiting for the same message of the same interface in parallel. The messages arrive at different points in times (t1 and t2) while both receive steps wait from the correlation activation time on. The semantics are as follows: the first message does not complete both receives steps; each receive step gets its own message, while the order can be arbitrary.

Having described receive messaging and steps, send messages and steps will now be described. The send step is used to send a message that is already available within the process. Executing a send step, the process engine submits the (outbound) message to the pipeline for processing. The receivers for a message to be sent can be determined or specified via routing configuration in the directory, or directly by process definition in combination with the receiver determination step or using another message with which to reply).

Figure 13:
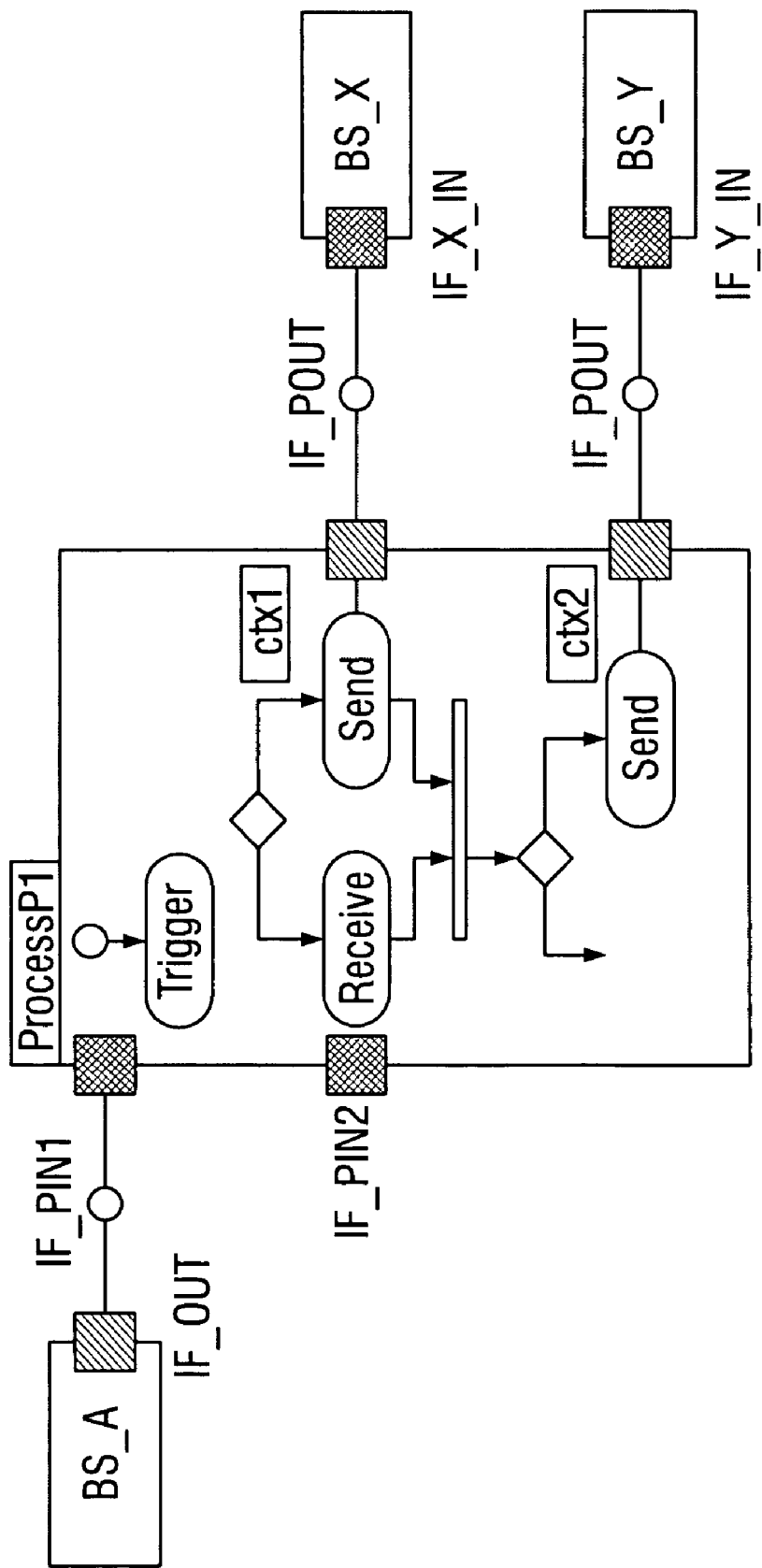
FIG. 13 illustrates the use of context objects to distinguish from among different send steps on the same interface.

When the routing configuration is retrieved from the directory, the process name and the outbound interface are the sender information within the message. The message is submitted to the pipeline where the suitable routing relations are evaluated to determine target interface(s) and receiver(s). Context objects may be used to distinguish from among different send steps on the same interface, as shown in FIG. 13. When receivers are specified directly by process definition, the receiver (i.e. business system) may be entered directly or calculated by the receiver determination step. In this case, the pipeline must not calculate the receivers again upon the Routing configuration.

If the routing configuration (directory) is used, context objects are needed to distinguish send steps that send messages of the same interface from different places in the process, e.g. the send steps are each located in an exclusive branch of a switch element and need to be sent to different receivers. Without context information, it may not be possible to distinguish the send steps from each other because they are part of the same process and are being sent on the same interface. Routing can only use the process name and interface name. Context objects will make it possible to submit additional context information via send step to the routing. This information can be used in a routing condition and classify the routing relation true or false.

Asynchronous communication is the default behavior for a send step. The message is send to its receivers using the pipeline (without receiving a response or a fault message). For asynchronous communication, it is possible to wait for acknowledgements (none/pipeline, technical, application (default: no acknowledgement)). These acknowledgements are no business messages but (positive or negative) technical responses of the receiver. Acknowledgments can only be received, if the receiver (adapter, system, etc.) is able to send these acknowledgements.

Errors while sending will not be visible on the process level. Accordingly, the send step does not return any error states. It ends when the message can be submitted to the pipeline and the process engine receives a requested acknowledgement (if any is requested). Retries are realized by the XI runtime (number of retries could be defined in CPAs), as the process engine is not configured to execute any retries.

A send step can also be used for synchronous communication. In this case, the send step deals with two messages: one message that is sent and another message that is received as a result. Using synchronous communication, it is not necessary to handle acknowledgements since a call will immediately return a result.

The process engine is also able to send positive or negative acknowledgements via send step. Acknowledgements that are requested by the caller systems and have not been answered explicitly will be satisfied when the process terminates normally.

The receiver determination step calls the receiver determination of the pipeline to calculate the receivers of a message using the routing information. The step returns a list of receivers. The list of receivers allows a process-controlled multicast. Like the send step, the receiver determination step provides context information that can be used for evaluating routing conditions.

A transformation step is configured to: merge messages (N:1); split messages (1:N); and transform one message from one interface to another (1:1 as special case). For each transformation step, it may be necessary to specify both the mapping program (interface mapping) and the messages that take part in the transformation scenario. The mapping programs need to be able to handle the different transformation cases. The transformation of the messages is done by a service that is called by the process engine. The transformation service should be able to process complete messages (payload, attachments, etc.).

Figure 14:
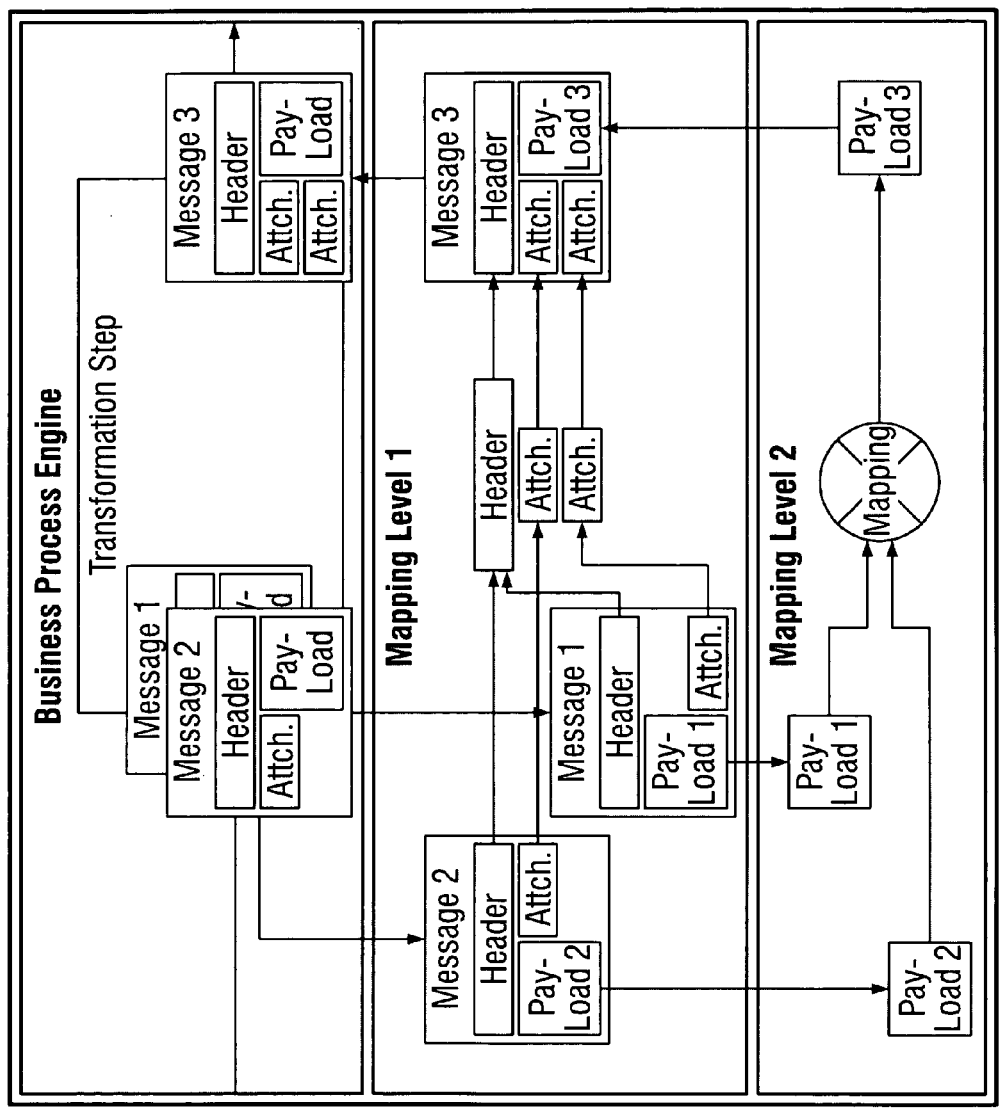
FIG. 14 illustrates an aspect of a merge case in a BPM system.

Attachments that are linked to the message payload (e.g. catalog reference pictures as attachments) need to be treated by this service as follows. In a merge case, as illustrated by FIG. 14, all attachments are collected and attached to the merged message. Attachments carry a name which is referenced by the message payload. All attachments must use a unique name (e.g. GUID). In the split case, all attachments can only simply be replicated and attached to the created messages, even if a large amount of data is transported. Thus, the transformation step includes the operations of transform, merge and split. An operation of creating new messages is special case of the transformation step.

In operation, the transformation step calls a mapping service of the XI runtime, with one or several messages (not payloads) and the mapping program as import parameters, and receives one or more new messages (not only payload) as an export parameter. The transformation step operates on messages, and as such, other value sources or targets (e.g. simple XSD types) are preferably not used.

Figure 15:
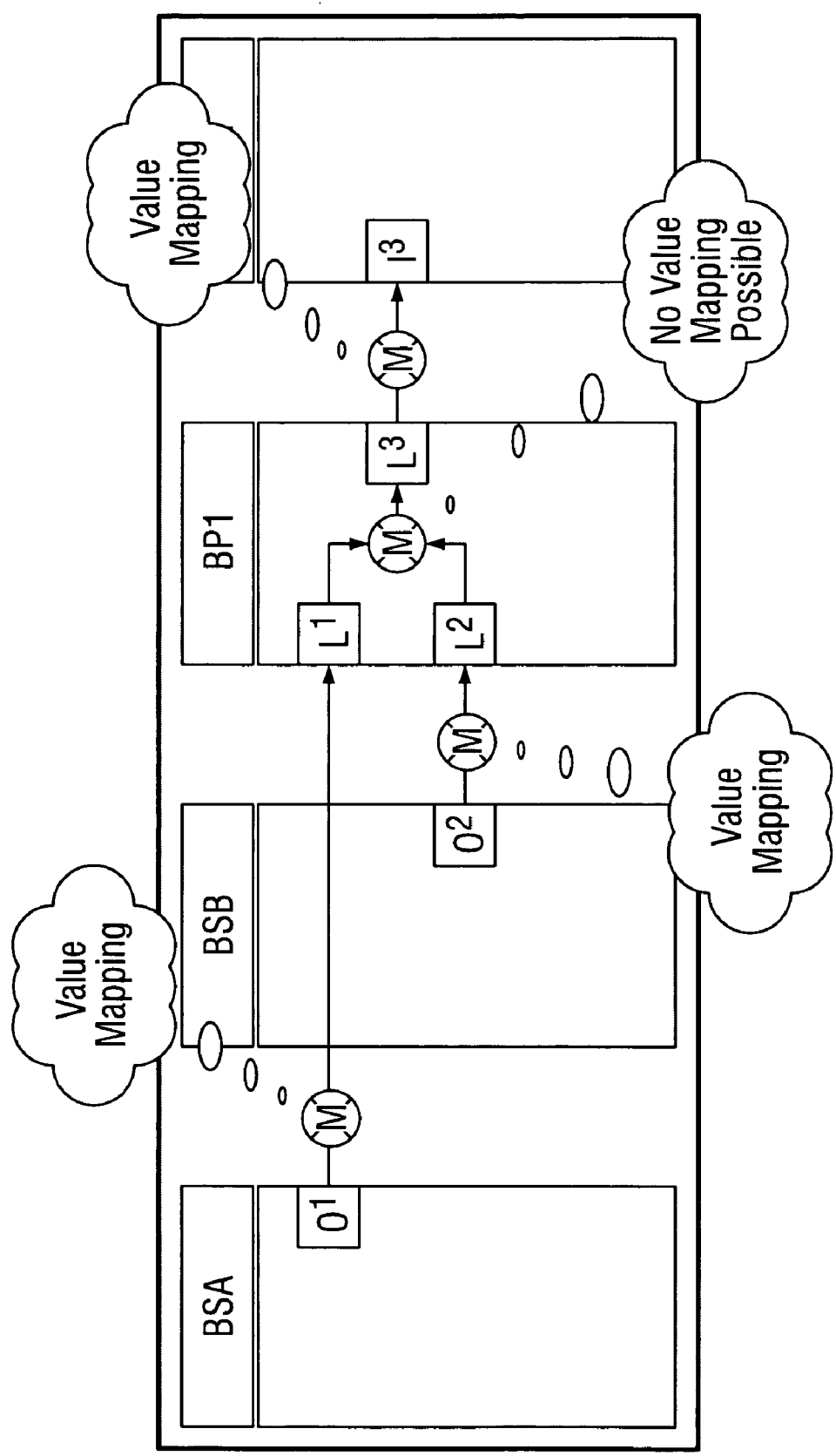
FIG. 15 illustrates a value mapping process as a process-normalized value-format operation.

Value mapping will not be possible within the process, as sender and/or receiver information that is needed for value mapping is not available within the process and cannot be submitted to the mapping program. Therefore a process needs a 'normalized' message format regarding values. As shown in FIG. 15, the value mapping to the process chooses the values of sender business system A (BSA) as a process-normalized value-format. However, when a process receives or sends a message, value mapping is possible.

Control flow relevant modeling elements or steps include switch, assign, control, block, parallel sections, loops, wait, empty, exceptions, and deadlines. A switch provides several branches, each equipped with a condition and an explicit order for evaluation. The first branch whose condition returns true will be taken at runtime. All other branches can be ignored. If no branch matches (i.e. all branch conditions return false), a default branch will be taken. The assign step changes the values of container elements (i.e. top level access). A message (payload, header, etc.) cannot be changed by this operation. To change the payload, the transformation step must be executed. The message payload can be accessed via Xpath, context objects, or other similar means.

The control step offers a number of different functions that influence the control flow, e.g. throw exceptions or terminate the process. The control step is a step type that is specialized for the different functions. The control step can include a throw exception function and/or a cancel/terminate function. In fault situations, it should be possible to throw an exception that will be handled by an exception handler. The exception that is thrown can be identified by the unique exception name. In fault situations, it must be possible to involve an user at some point. This implementation of the control step provides the possibility to send an alert to SAP Alert Management.

The cancel/terminate functionality allows terminating a process and all participating steps without fault-handling and compensation behavior. Explicit and implicit cancel functionalities can be distinguished. The explicit cancel functionality of the control step terminates the whole process upon a certain process state (received message(s) or deadlines). Processing this step, the process stops and the process instance itself as well as all active steps will be terminated.

Figure 17:
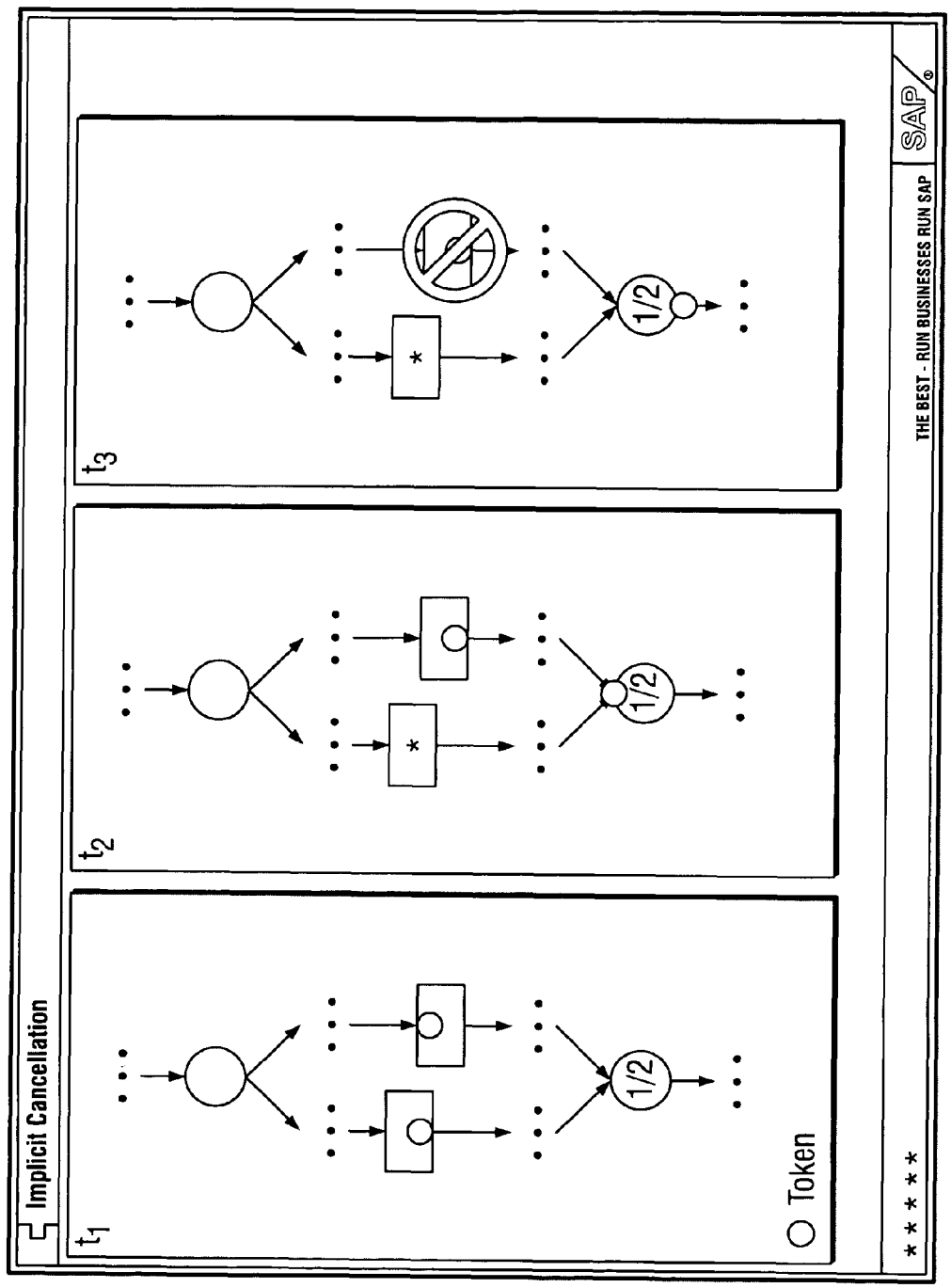
FIG. 17 illustrates an implicit cancellation operation.

The implicit cancel functionality is not modeled within a process, but is a feature of the process engine, as shown in FIG. 17. In comparison to the explicit termination, the implicit case does not affect the whole process but rather only a certain part of the process (e.g. one or more fork branches). One example of the implicit cancel functionality is a parallel section with two branches, where the first branch completes the parallel section at the join step (one of two). Accordingly, if one branch reaches the join step and the join condition is true, the other branch needs to be cancelled implicitly. Assume at t1 both branches are active. At t2 one branch reached the join step while the other branch is still in processing. At t3 the other branch is cancelled (join condition has been true for the first branch) and the process continues after the Join step. As with the explicit cancellation, no compensation is provided. The branch will be terminated implicitly without further notice. Eventual open communications must be considered when defining join conditions.

Blocks (known as "scopes" in BPEL or "sequences" in BPML) can be provided to define a collection of steps to be performed sequentially which can share a container definition. This fulfills also a documentation purpose. Blocks can also be used to define deadlines that cover more than one step, and to define exceptions and their reach. Since deadlines and exceptions will be defined for blocks, it is also possible to define deadline and exception handlers at a block.

Exceptions can be raised using a control step, as described above, or by the system. The modeling tool provides the possibility to define exception handlers. Exceptions allow the process logic to signal a business fault. Several different exception types include application exceptions explicitly thrown by the process logic, and system exceptions thrown by the process engine. Exceptions can be defined at the block level. The block represents the scope of its exceptions. Each block may have an arbitrary number of exceptions. Each exception carries a unique name and may not be redefined.

Exceptions can be raised via the control step (throw exception) identifying the unique exception name. Exception handlers can be defined for the existing exceptions within their scope. Throwing an exception can be handled as follows. First, an exception handler is found for the exception name. The inner block that surrounds the throw command is first searched; if the exception handler cannot be found in the surrounding block, go to next higher block, and so on as long as the exception handler cannot be found (exception propagating). Second, all active steps within the block that carries the exception handler are stopped. If the handler is found in a parent block, this block with all active steps will be stopped. Third, the exception handler is started and the steps within the exception handler are executed. Fourth, at the end of the exception handler, the block (in which the exception handler is defined) is completed as normal. If an exception cannot be handled in one of the blocks, the process will go to an error state.

Deadlines are provided to monitor due dates of a process, and to react upon a missed deadline. The modeling tool also provides the possibility to model deadline handlers. Deadlines will only be available for the modeling element block; other elements will not support deadlines. This allows monitoring a set of steps and avoids race conditions. Race conditions could occur if the deadline is attached to receive or send steps only and the deadline is reached before the step is instantiated.

Deadlines include the definition of the deadline due date, the deadline scope (when the deadline is activated and/or deactivated), and the reaction upon a missed deadline. The deadline definition can be programmed not to respect weekends, public holidays, etc. If a due date is reached, a deadline exception will be raised that terminates all active steps within the block and starts the corresponding deadline handler. A corresponding deadline handler can model the reaction upon a reached deadline. There may be no default deadline reaction. Each block may only carry one deadline. This deadline must have its own assigned exception name that can be used as a deadline exception. The deadline handler is defined for this exception.

Deadlines include the deadline definition (date and time) and a reaction upon a missed deadline. The system supports definition of time restrictions for the execution of process activities (e.g. process has to STOP three days before a payload specified deadline). The reaction can entail sending a message to the appropriate business system, and/or an alerting mechanism (user notification e.g. via SAP Alert Management) for exception situations, e.g. if conditions are not fulfilled within a given timeframe.

The process builder is configured to provide two kinds of parallel sections: a static and a dynamic variant. The static parallel section (fork and join) provides a parallel section with an arbitrary number of branches, which number can be defined at definition time, and synchronization. This parallel section will terminate upon the following conditions: as a specialized condition, a "n-out-of-m" logic is provided (all logic is also possible using "n-out-of-n"); as an arbitrary condition operating upon messages and container variables. Both conditions will be checked whenever a branch reaches the join step. If one condition returns true, all other active branches will be terminated. The process continues with the next step immediately after the end of the parallel section.

The dynamic parallel section (ParForEach) is a block that provides a parallel section with one defined branch and synchronization. The number of parallel executions of this branch can be determined at runtime. The dynamic parallel section has a multi-line element (table) assigned. The defined branch (the block) is executed for each line of this element in parallel. If the multi line element is empty, the dynamic parallel section will be completed immediately. Each branch has its own address space. The dynamic parallel section will terminate upon certain conditions: as a specialized default condition, all branches must complete; as an arbitrary condition operating upon messages and container variables. Both conditions will be checked whenever a branch reaches its end (end of the block). If one condition returns true, all other active branches will be terminated. The process continues with the next step immediately after the end of the parallel section.

The Process Builder can provide different kinds of loops. One type of loop is an "while" loop. While loops repeat over a set of steps until an arbitrary condition is fulfilled. Another type of loop is a "ForEach" loop. A ForEach is a block that has a multi-line element (table) assigned. It loops over the given multi-line element and executes the associated steps for each line of the element in a sequence (one after another). If the multi-line element is empty, the ForEach loop will not be executed (i.e. the process will not go to error-state). The process continues with the next step immediately behind the end of the block.

The wait step specifies a delay within the process flow until a certain deadline is reached or a delay for a certain period has passed. The empty element or step simply does nothing and must act as a placeholder for steps to be modeled.

The control flow modeling elements having thus been described, modeling patterns will now be discussed. These patterns are high-level building blocks used to construct processes implementing the requirements as mentioned above. Each pattern can be combined with one or more other patterns and also with atomic process engine functions such as deadlines, exceptions, etc. Modeling patterns include: serialize messages/sequences; transformations/merge/split; multicast; and collect.

For messages and/or sequences to be serialized, several receive steps (to get all the needed messages into the process) and several send steps can be combined in a manner which will guarantee the order. It is important that the send steps make use of the technical acknowledgements to ensure that a message actually drops into the receiver system. Alternatively, another receive step must be modeled to get the corresponding business responses. Thus, such a pattern can include the steps of: receive messages; and send received messages in a given order respecting technical dependencies of receivers. For the latter step, wait for acknowledgement of a message before sending the next message; and address one receiver per message.

Transformations/merge/split modeling patterns include: (N:1) transform collected messages to one new message (e.g. transform several invoices to one combined invoice); or (1:N) transform one message into several other messages (transform a combined invoice to invoice respecting the original POs). The multicast modeling patterns include the steps of: receive message or create it via transformation; get receivers; and send out messages to receivers. The last step can be executed without caring about answers/acknowledgements (Fire and forget), or by receiving a number of answers/acknowledgments (inverse serialization).

For the execution of message-relevant steps, the process engine relies on services that are provided by the XI runtime and not by the process engine. The XI runtime provides the following services used by the process engine: send; receiver determination; and transformation. A modeling tool can be provided. The process engine can also provide a technical monitoring from message view (XI runtime) and from process view (process runtime). It should be possible to navigate from process monitoring to message monitoring and vice versa. In addition, integration in the XI monitoring infrastructure (i.e. runtime workbench) can be performed. The process engine component test should signal whether the process engine is alive. Finally, the processes can transfer alerts in the CCMS-infrastructure.

Monitoring can be split up into two main areas: monitoring of the overall state of the process engine; and monitoring of one single process instance. For the former area, the system supports process monitoring during runtime, such as, for example, a graphical display of the actual state of all active process instances. The system also can support a data volume and runtime performance information for the process monitoring. For the latter area, the system is configured to write process logs for each process instance (the application needs to write its own application messages to the protocol), and to display process logs along with the possibility to select with application data (e.g. order number).

Figure 16:
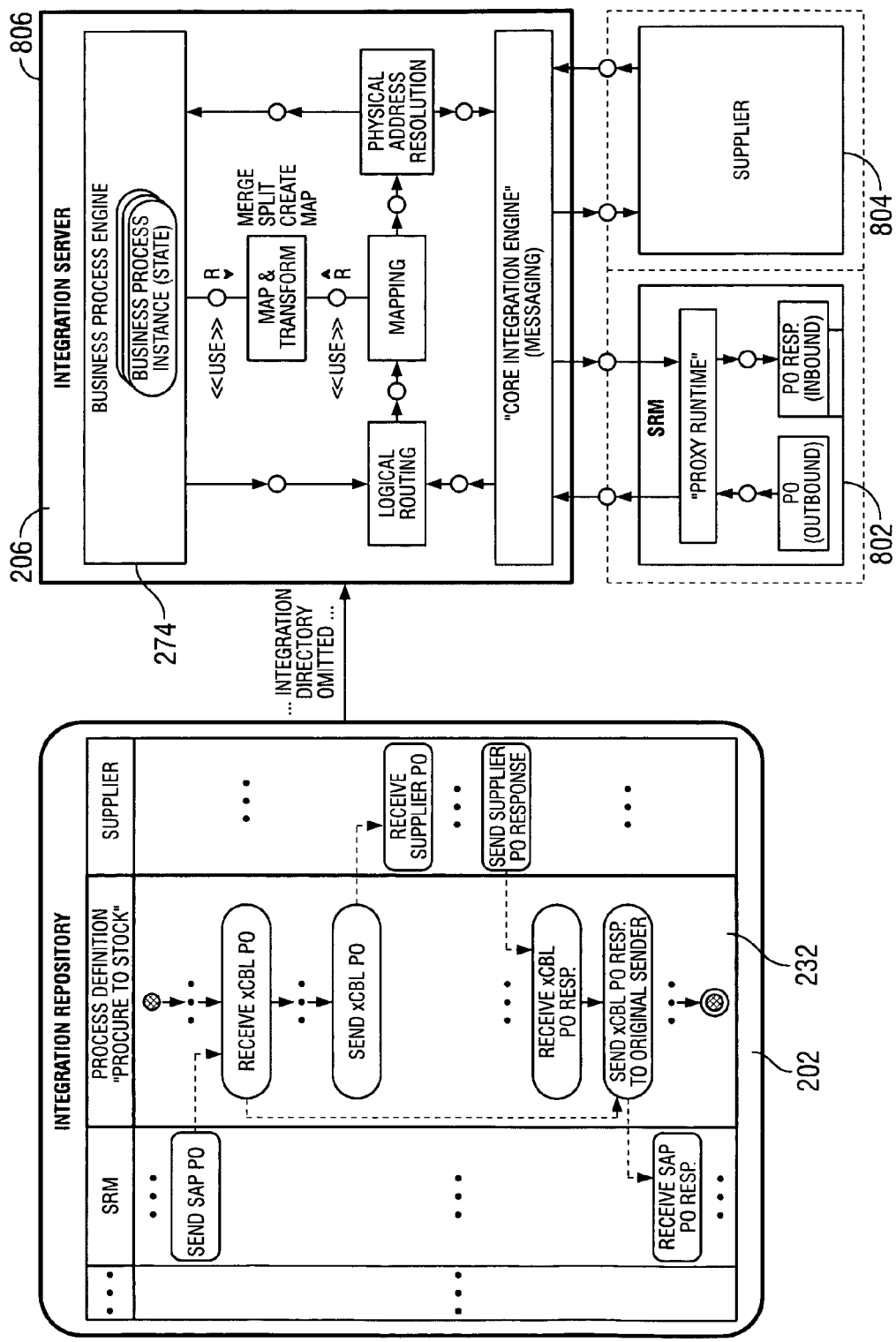
FIG. 16 illustrates an embodiment of a process engine runtime.

FIG. 16 illustrates an example of the business process engine runtime 600. In the example, an SRM application 802 communicates with a supplier application 804 via the integration server 206. Although represented in runtime only with respect to SRM application 802, each application includes inbound and outbound interfaces, and may include a proxy for connectivity to the integration server 206. The integration repository 202 includes an instance of a business process 232 representing semantically-linked communication between the SRM application 802 and the supplier application 804.

The business process instance 232 includes a process definition that defines the communication, including logical and physical interfaces, between the SRM and supplier applications. The process definition defines the messaging action and content that takes place between services of those applications, and can be as fine-grained as desired.

The integration server 206 includes the business process engine 274, which receives and executes the business process instance(s) from the integration repository (and via the integration directory, which is not shown). The integration server 206 also includes messaging functions and services 806, such as logical routing, mapping, and physical address resolution. These functions and services 806 also include a map a transformation service, for merging, splitting, creating, and/or mapping messages between sender and receiver applications. The integration server 206 also provides core messaging services for Web-based messaging between application services.

Although a few embodiments have been described in detail above, other modifications are possible. Other embodiments may be within the scope of the following claims.

The invention claimed is:

1. A computer system for managing collaborative processing between software components in an exchange infrastructure of an enterprise system, the computer system comprising:
a runtime engine implemented on one or more processors, the runtime engine comprising a business process engine being configured for runtime execution of business process management, the one or more processors executing instructions stored non-transitorily in a computer readable storage medium to cause the runtime engine to perform functions comprising:
receiving a message from a first application in the exchange infrastructure;
accessing a configuration-specific collaboration description of a system landscape of the exchange infrastructure from an integration directory, the integration directory including one or more context objects that provide access-related information, the configuration-specific collaboration description having been captured at run time by retrieving a model of a business process from an integration repository, accessing a list of currently installed software components in the exchange infrastructure from a system landscape directory, retrieving the connectivity descriptions for each a plurality of currently installed software components from an integration repository, and creating a configuration-specific description of the one or more context objects that use message content to determine a message recipient according to the model of the business process, the integration repository storing, at design time, the model of the business process that associates a first application and a second application of the exchange infrastructure according to requirements of the business process and that links a first interface description of the first application and a second interface description of the second application, the integration repository comprising connectivity descriptions of the first application and the second application and all other software components available to be installed in the exchange infrastructure, design-time interface descriptions of the first application and the second application, message context descriptions of messages to be exchanged between the first application and the second application, and interface mapping descriptions associating pairs of the design-time interface descriptions, wherein the design-time interface descriptions, the message context descriptions, and the interface mapping descriptions are linked to at least one design-time business process;
determining, using the business process engine to execute the model of the business process, a required interface for delivering the message, the determining comprising identifying the second application as a receiver of the message based on the configuration-specific description of the one or more context objects, reading a routing rule corresponding to the second application from the configuration-specific collaboration description captured to the integration directory from the integration repository, evaluating the routing rule, applying a mapping that is specified by the routing rule and that defines a required transformation between the first interface and the second interface, and generating a semantic link for the message to associate the message with the business process;
transforming the message into a format expected by the second application according to the required transformation; and executing a messaging service between the first and the second application, the messaging service being defined by the model of the business process and correlating the message based on the semantic link.

2. A system in accordance with claim 1, further comprising the integration repository.

3. A system in accordance with claim 2, further comprising the integration directory.

4. A system in accordance with claim 1, wherein the messaging service comprises logical routing of the message, mapping of the message from the first application to the second application, and resolving physical addresses of the first application and the second application, in accordance with the business process executed by the business process engine.

5. A system for managing collaborative processing between software components in an exchange infrastructure of an enterprise system, the system comprising:
an integration repository that stores, at design time, a model of a business process that associates a first application and a second application of the exchange infrastructure according to requirements of the business process and that links a first interface description of the first application and a second interface description of the second application, the integration repository comprising connectivity descriptions of the first application and the second application and all other software components available to be installed in the exchange infrastructure, design-time interface descriptions of the first application and the second application, message context descriptions of messages to be exchanged between the first application and the second application, and interface mapping descriptions associating pairs of the design-time interface descriptions, wherein the design-time interface descriptions, the message context descriptions, and the interface mapping descriptions are linked to at least one design-time business process; and an integration directory that captures, at run time, a configuration-specific collaboration description of a system landscape of the exchange infrastructure to, the capturing comprising retrieving the model of the business process from the integration repository, accessing a list of currently installed software components in the exchange infrastructure from a system landscape directory, retrieving the connectivity descriptions for each of the currently installed software components from the integration repository, and creating a configuration-specific description of one or more context objects that use message content to determine a message recipient according to the model of the business process, wherein the context objects provide access-related information;

the integration repository and the integration directory are accessible by a runtime engine that comprises a business process engine, that receives a message from the first application, that determines a required interface for delivering the message, generates a semantic link for the message to associate the message with the business process, transforms the message into a format expected by the second application according to the required transformation; executes a messaging service between the first and the second application, the messaging service being defined by the model of the business process and correlating the message based on the semantic link.

6. A system in accordance with claim 5, wherein the integration repository further includes design-time business scenario descriptions that represent an abstraction of the design-time business processes.

7. A system in accordance with claim 5, wherein each design-time interface description includes a link to at least one interface type object and/or at least one message type object.

8. A system in accordance with claim 5, wherein the integration directory further includes a configuration-specific business scenario description, which comprise the configuration-specific business process.

9. A system in accordance with claim 8, wherein each configuration specific business process includes a link to at least one routing relation object and/or at least one mapping relation object.

10. A method for managing collaborative processing between software components in an exchange infrastructure of an enterprise system, the method comprising:

storing, in an integration repository at design time, a model of a business process that associates a first application and a second application of the exchange infrastructure according to requirements of the business process and that links a first interface description of the first application and a second interface description of the second application, the integration repository comprising connectivity descriptions of the first application and the second application and all other software components available to be installed in the exchange infrastructure, design-time interface descriptions of the first application and the second application, message context descriptions of messages to be exchanged between the first application and the second application, and interface mapping descriptions associating pairs of the design-time interface descriptions, wherein the design-time interface descriptions, the message context descriptions, and the interface mapping descriptions are linked to at least one design-time business process;

capturing a configuration-specific collaboration description of a system landscape of the exchange infrastructure to an integration directory at run time, the capturing comprising retrieving the model of the business process from the integration repository, accessing a list of currently installed software components in the exchange infrastructure from a system landscape directory, retrieving the connectivity descriptions for each of the currently installed software components from the integration repository, and creating a configuration-specific description of one or more context objects that provide access-related information and that use message content to determine a message recipient according to the model of the business process;

receiving a message from the first application at a runtime engine implemented on one or more processors, the runtime engine comprising a business process engine;

determining, using the business process engine to execute the model of the business process, a required interface for delivering the message, the determining comprising identifying the second application as a receiver of the message based on the configuration-specific description of the one or more context objects, reading a routing rule corresponding to the second application from the configuration-specific collaboration description captured to the integration directory from the integration repository, evaluating the routing rule, applying a mapping that is specified by the routing rule and that defines a required transformation between the first interface and the second interface, and generating a semantic link for the message to associate the message with the business process;

transforming the message into a format expected by the second application according to the required transformation; and executing, by the runtime engine, a messaging service between the first and the second application, the messaging service being defined by the model of the business process and correlating the message based on the semantic link.

11. A method in accordance with claim 10 further, comprising linking the business process model to at least one context object that describes the routing of the message between the first application and the second application based on message content.

12. A method in accordance with claim 10, further comprising linking the business process model to at least one interface mapping description that describes the mapping between the first interface and the second interface.

13. A method in accordance with claim 10, further -comprising defining the configuration-specific business process associated with the runtime configuration of an enterprise application landscape of the enterprise system and based on the business process model.

14. A method in accordance with claim 13 further comprising:

generating an instance of at least one configuration-specific business process in the runtime engine; and executing the instance to communicate the message according to the at least one configuration-specific business process.

15. A method in accordance with claim 14, further comprising communicating the message between the first application and the second application according to the configuration-specific business process.

* * * * *